(12) United States Patent
Hayashi et al.

(10) Patent No.: US 9,798,430 B2
(45) Date of Patent: Oct. 24, 2017

(54) INPUT DEVICE, METHOD OF MANUFACTURING THE SAME, AND ELECTRONIC INFORMATION EQUIPMENT

(71) Applicant: SHARP KABUSHIKI KAISHA, Osaka-shi, Osaka (JP)

(72) Inventors: Shogo Hayashi, Osaka (JP); Kazutoshi Kida, Osaka (JP); Yuhji Yashiro, Osaka (JP); Kazuya Yoshimura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 127 days.

(21) Appl. No.: 14/764,106

(22) PCT Filed: Jan. 14, 2014

(86) PCT No.: PCT/JP2014/000113
§ 371 (c)(1),
(2) Date: Jul. 28, 2015

(87) PCT Pub. No.: WO2014/119231
PCT Pub. Date: Aug. 7, 2014

(65) Prior Publication Data
US 2015/0370375 A1 Dec. 24, 2015

(30) Foreign Application Priority Data
Jan. 29, 2013 (JP) .................. 2013-014638

(51) Int. Cl.
*G06F 3/044* (2006.01)
*G06F 1/16* (2006.01)
*G06F 3/041* (2006.01)

(52) U.S. Cl.
CPC ............... *G06F 3/044* (2013.01); *G06F 1/16* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC .......... G06F 3/044; G06F 3/0412; G06F 1/16; G06F 2203/04103; G06F 2203/04112; G06F 2203/04111
See application file for complete search history.

(56) References Cited

U.S. PATENT DOCUMENTS

2013/0242485 A1* 9/2013 Ohtani .................. G06F 3/041
361/679.01

FOREIGN PATENT DOCUMENTS

| JP | 2012-094115 A | 5/2012 |
| JP | 2013-143045 A | 7/2013 |
| JP | 2013-246723 A | 12/2013 |

* cited by examiner

*Primary Examiner* — Liliana Cerullo
(74) *Attorney, Agent, or Firm* — Birch, Stewart, Kolasch & Birch, LLP

(57) ABSTRACT

An input device having a row electrode and a column electrode made by patterning a meshed metallic layer by forming a dividing section on a metallic line constituting the meshed metallic layer can make areas of individual dividing sections of the metallic lines uniform, whereby uneven shading due to the patterned, meshed conductive layer is suppressed from appearing on a touch operation surface.

In the input device having the row electrode and the column electrode made by patterning the meshed metallic layer by forming the dividing section on the metallic line constituting the meshed metallic layer, at an intersecting section where metallic lines Mw2 constituting a meshed conductive layer Lp2 intersects an ideal contour Sp2 of a meshed column electrode, the direction for dividing the metallic lines at the intersecting section is set to the direction matching the direction of width of the metallic lines such that the area of the dividing section traversing the metallic line is minimal.

10 Claims, 25 Drawing Sheets

Fig.23
Conventional Art
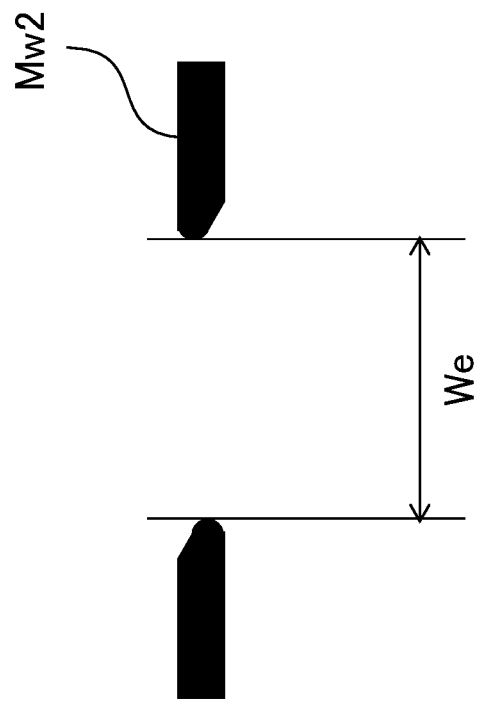
(b)
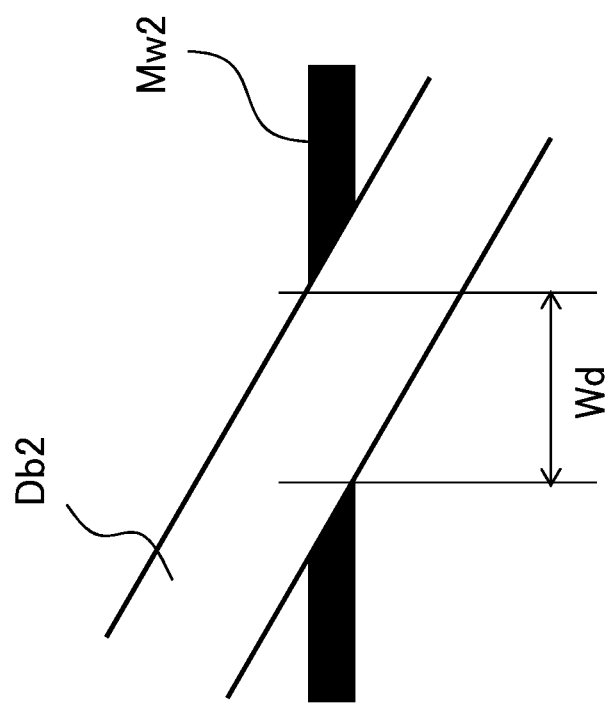
(a)

INPUT DEVICE, METHOD OF MANUFACTURING THE SAME, AND ELECTRONIC INFORMATION EQUIPMENT

TECHNICAL FIELD

The present invention relates to an input device, a method of manufacturing the same, and electronic information equipment, and specifically relates to an input device for detecting an input operation based on a change in capacitance between adjacent electrodes among a plurality of electrodes arranged on an input operation surface, a method of manufacturing the same, and electronic information equipment using such an input device.

BACKGROUND ART

In recent years, electronic information equipment such as a computer or a mobile phone, which enables an input operation utilizing a display of a display device, has been developed. A touch panel (also called a touch sensor) used in combination with a display device is installed as an input device in such electronic information equipment.

There are various forms of touch panels, such as the resistive film type, surface acoustic wave type, and infrared type touch panels. However, touch panels of capacitive type (hereinafter, also referred to as capacitive touch panels), which are excellent in terms of durability or the like, are generally used. Such capacitive touch panels have a plurality of electrodes arranged on an input operation surface (hereinafter, also simply referred to as an operation surface) and are configured to detect a change in capacitance corresponding to a touch operation or proximity operation with a finger of an operator between adjacent electrodes as an input operation.

FIG. 13 is a diagram for explaining a conventional capacitive touch panel, which shows an arrangement of sensor electrodes for detecting a change in capacitance due to a touch operation or a proximity operation.

A touch panel 50 has, for example, a plurality of rhombus sensor electrode 51a, 52a and a plurality of triangular sensor electrodes 51b, 52b (hereinafter, also simply referred to as sensor electrodes) arranged in a matrix on an insulation transparent substrate 50a such as a glass substrate or a plastic film. Herein, the sensor electrodes 51a and 51b aligned in a row direction (X direction) are electrically connected by electrode connecting sections 51c to constitute a plurality of row electrodes (X sensors) 51. Further, the sensor electrodes 52a and 52b are electrically connected by electrode connecting sections 52c aligned along the column direction (Y direction) to constitute a plurality of column electrodes (Y sensor) 52. Herein, the triangular sensor electrodes 51b constituting the row electrode 51 are disposed at both ends of the row electrode 51, and the rhombus sensor electrodes 51a are disposed at positions other than both ends of the row electrode 51. Similarly, the triangular sensor electrodes 52b constituting the column electrode 52 are disposed at both ends of the column electrode 52, and the rhombus sensor electrodes 52a are disposed at positions other than the both ends of the column electrode 52. Further, the sensor electrodes 51a and 51b constituting the row electrode 51, and the sensor electrodes 52a and 52b constituting the column electrode 52 are alternately arranged in the longitudinal and transverse directions. The sensor electrodes 51a, 51b, 52a, 52b and the electrode connecting sections 51c and 52c are constituted with a transparent conductive film, such as an ITO (indium tin oxide) film.

For such a capacitive touch panel 50, the region where the row electrode 51 and the column electrode 52 are arranged forms the operation surface. When an operator touches the operation surface with a finger or brings a finger near a certain position on the operation surface, capacitance between the sensor electrodes 51a, 51b constituting the row electrode 51, and the sensor electrodes 52a, 52b constituting the column electrode 52 adjacent thereto would change at the position where the finger touched or was brought near. The position where the finger touched or was brought near on the operation surface is detected as an operation position by this change in capacitance.

In an electronic information equipment equipped with a touch panel as well as a display device, coordinate information indicating a position on a display screen of the display device corresponding to the detected operation position is generated based on the operation position, and information processing corresponding to the input operation is performed based on the coordinate information.

However, an ITO film, which is a transparent conductive film constituting row and column electrodes, has high resistivity that is commonly in several tens of $\Omega/\square$. For this reason, when a large touch panel is manufactured, sensitivity of detection with respect to capacitance decreases with the increase in the resistance value between terminals of a row electrode or a column electrode such that it becomes difficult to make such electrodes operate as a touch switch.

Thus, a capacitive touch panel with low resistance row and column electrodes has already been developed by constituting a sensor electrode and an electrode connecting section with a metallic film instead of an ITO film.

Such a touch panel is configured so that transmittance of electrodes is made to be 70% or greater by constituting a rhombus sensor electrode and an electrode connecting section with a meshed conductive layer (hereinafter, also referred to as meshed metallic layer) consisting of copper or copper alloy, whereby a low resistance electrode is realized while maintaining visibility with respect to a display screen of a display device positioned on the rear side of the touch panel.

Meanwhile, a touch panel, in which intersecting row electrodes and column electrodes are formed on a single insulation transparent substrate as in the capacitive touch panel described above, requires a structure for insulating a row electrode and a column electrode at an intersecting section of both electrodes. Thus, the structure of the electrodes is complex, and an electrode forming process requires a step of patterning at least two layers of conductive layers and a step of forming an insulation film for insulating the top and bottom conductive layers.

In view of this, a capacitive touch panel with the following structure has been developed. In the structure, a sensor sheet made by forming a row electrode on an insulation sheet substrate is bonded together with a sensor sheet made by forming a column electrode on an insulation sheet substrate.

FIGS. 14 and 15 are diagrams for explaining such a touch panel with a structure in which two sensor sheets are bonded together as another example of a conventional touch panel. FIG. 14(a) shows an arrangement of electrodes of this touch panel. FIG. 14(b) shows a cross-sectional structure of this touch panel (portion at the A-A' line in FIG. 14(a)). FIG. 15(a) and FIG. 15(b) show an arrangement of row electrodes and column electrodes constituting each sensor sheet, respectively.

This touch panel 60 has a first sensor sheet 601 made by forming a row electrode (X sensor) 61 with a meshed metallic layer on an insulation sheet substrate 60a consisting of PET or the like, and a second sensor sheet 602 made by forming a column electrode (Y sensor) 62 with a meshed metallic layer on an insulation sheet substrate 60b consisting of PET or the like. The touch panel has a structure in which the sensor sheets 601 and 602 are bonded together with an insulation adhesive 603.

Herein, a meshed metallic layer has a structure in which a plurality of metallic lines extending in one direction intersect a plurality of metallic lines extending in another direction to form a square-shaped mesh pattern. A meshed metallic layer constituting a row electrode and a meshed metallic layer constituting a column electrode have identical structures in terms of design.

The row electrode (X sensor) 61 and the column electrode (Y sensor) 62 have the same arrangement pattern as those in the touch panel 50 using an ITO film for the row electrode 51 and the column electrode 52 shown in FIG. 13. In other words, the row electrode 61 is made by electrically connecting a plurality of rhombus sensor electrodes 61a and triangular sensor electrodes 61b (hereinafter, simply referred to as sensor electrodes) arranged in a matrix on the insulation sheet substrate 60a along the row direction (X direction) with electrode connecting sections 61c. Further, the column electrode 62 is made by electrically connecting a plurality of rhombus sensor electrodes 62a and triangular sensor electrodes 62b arranged in a matrix on the insulation sheet substrate 60b along the column direction (Y direction) with electrode connecting sections 62c. Herein, the triangular sensor electrodes 61b constituting the row electrode 61 are disposed at both ends of the row electrode 61, and the rhombus sensor electrode 61a are disposed at positions other than the both ends of the row electrode 61. Similarly, the triangular sensor electrodes 62b constituting the column electrode 62 are disposed at both ends of the column electrode 62, and the rhombus sensor electrodes 62a are disposed at positions other than the both ends of the column electrode 62.

Such a capacitive touch panel 60 using a meshed metallic layer for row and column electrodes has problems, such as uneven shading appearing on a surface of the touch panel due to dislocation in the bonding of the two sensor sheets, or uneven shading appearing due to a difference in line widths between a metallic line of the meshed metallic layer constituting the row electrode, and a metallic line of the meshed metallic layer constituting the column electrode. Such a difference in line widths of metallic lines occurs due to variability in the process conditions during etching for processing a metallic film in a meshed form.

As a measure against such problems, Patent Literature 1 discloses a touch panel using a whole surface mesh structure which leaves portions that do not function as a row electrode or a column electrode as a dummy electrode instead of a structure which removes portions that do not function as a row electrode or a column electrode from the meshed metallic layers constituting the row and column electrodes in the first and second sensor sheets bonded together (see FIG. 15(a) and FIG. 15(b)), such that the distribution of metallic lines constituting the row electrode or the column electrode is more uniform in each sensor sheet.

FIGS. 16 and 17 are diagrams for explaining the touch panel disclosed in Patent Literature 1. FIG. 16(a) shows an arrangement of electrodes in this touch panel. FIG. 16(b) shows a cross-sectional structure of this touch panel (portion at B-B' line in FIG. 16(a)). FIGS. 17(a) and 17(b) show an arrangement of row electrodes and column electrodes constituting first and second sensor sheets to be bonded together, respectively.

A touch panel 70 has a first sensor sheet 701 made by patterning a meshed metallic layer formed on an insulation sheet substrate 70a so that a row electrode (X sensor) 71 is formed, and a second sensor sheet 702 made by patterning a meshed metallic layer formed on an insulation sheet substrate 70b so that a column electrode (Y sensor) 72 is formed. The touch panel has a structure in which the sensor sheets 701 and 702 are bonded together with an insulation adhesive 703.

Herein, the column electrode 71 is made by electrically connecting a plurality of rhombus sensor electrodes 71a and triangular sensor electrodes 71b (hereinafter, simply referred to as sensor electrodes) arranged in a matrix on the insulation sheet substrate 70a along the row direction (X direction) with electrode connecting sections 71c. On the insulation sheet substrate 70a, a rhombus dummy electrode 71d and a triangular dummy electrode 71e that are electrically separated from the row electrode 71 are formed such that the dummy electrodes are positioned in a region other than the regions occupied by the sensor electrodes 71a and 71b constituting the row electrode 71. The triangular dummy electrode 71e is disposed on a peripheral edge section of the first sensor sheet 701, and the rhombus dummy electrode 71d is disposed on a region other than the peripheral edge section of the first sensor sheet 701.

Similarly, the column electrode 72 is made by electrically connecting a plurality of rhombus sensor electrodes 72a and triangular sensor electrodes 72b (hereinafter, simply referred to as sensor electrode) arranged in a matrix on the insulation sheet substrate 70b along the column direction (Y direction) with electrode connecting sections 72c. On the insulation sheet substrate 70b, a rhombus dummy electrode 72d and a triangular dummy electrode 72e electrically separated from the column electrode 72 are formed such that the dummy electrodes are positioned in a region other than the regions occupied by the sensor electrodes 72a and 72b constituting the column electrode 72. The triangular dummy electrode 72e is disposed at a peripheral edge section of the second sensor sheet 702, and the rhombus dummy electrode 72d is disposed in a region other than the peripheral edge section of the second sensor sheet 702.

Herein, a meshed metallic layer has the same structure as the meshed metallic layer in the touch panel in which two sensor sheets are bonded together, as explained in FIGS. 14 and 15. In other words, a meshed metallic layer has a structure in which a plurality of metallic lines extending in one direction intersect a plurality of metallic lines extending in another direction to form a square-shaped mesh. A meshed metallic layer constituting a row electrode and a meshed metallic layer constituting a column electrode have identical structures in terms of design.

Further, Patent Literature 2 also discloses a touch panel with a sensor sheet having a whole surface mesh structure as in Patent Literature 1, wherein metallic lines of meshed metallic layers are divided along the contour of a row electrode and a column electrode to form a meshed row electrode and a meshed column electrode.

CITATION LIST

Patent Literature

Patent Literature 1: Japanese Laid-Open Publication No. 2010-262529

Patent Literature 2: Japanese Laid-Open Publication No. 2006-344163

SUMMARY OF INVENTION

Technical Problem

The issues discovered by the inventors are explained hereinafter.

In the touch panel 70 with a sensor sheet having a whole surface mesh structure as discussed above, when the touch panel is combined with a display device having a pixel array made by arranging a plurality of pixels, moire may appear due to the positional relationship between the direction of arrangement of metallic lines of meshed metallic layers constituting a row electrode and a column electrode of the touch panel and the direction of arrangement of the pixels in the pixel array of the display device. To avoid such moire from appearing, it is necessary to tilt the metallic lines of the meshed metallic layers with respect to the pixel array in a direction other than the horizontal direction, vertical direction, and the diagonal 45° direction of the pixel array. However, the direction toward which the row and column electrodes extend (X direction and Y direction in an operation surface of the touch panel) needs to be strictly matched with the horizontal direction and vertical direction in the pixel array.

As a result, in the case where the sensor sheets 701 and 702 have a whole surface mesh structure in the touch panel 70 with a structure in which sensor sheets are bonded together, a cut (i.e., dividing line) formed on a metallic line of a meshed metallic layer along the contour of the row electrode 71 and the column electrode 72 would face a direction other than the horizontal direction, vertical direction, and diagonal 45° direction with respect to the metallic line of the meshed metallic layer (each side of a square shaped meshed frame) when patterning the meshed metallic layer, and the length of the divided portion in the direction toward which the metallic line extends, would be different depending on the location where the contours of the row electrode 71 and the column electrode 72 intersect with the metallic line of the meshed metallic layer. In other words, a metallic line of a meshed metallic layer has a certain width and a dividing line is also a division band with a certain width. Thus, the area of a portion of the meshed metallic layer where a metallic line is removed in order to separate row and column electrodes from the meshed metallic layer (portion where the dividing line and metallic line overlap) differs depending on the location, whereby a problem of a shading appearing on the surface of the touch panel occurs.

This issue is explained in detail in accordance with the procedure for designing a conduction pattern to form a row electrode of a sensor sheet with a whole surface mesh structure.

FIG. 18 shows a pattern of metallic lines of a meshed metallic layer defined by a rotated coordinate system C', which is rotated to the right only by a predetermined angle (45−α) (α: 0<α<45) with respect to a standard coordinate system C corresponding to a touch panel operation surface. FIG. 19 shows a pattern of column electrodes and the dummy electrodes thereof, defined by the rotated coordinate system C'. The X and Y directions of the standard coordinate system C correspond to the horizontal and vertical directions of the touch panel operation surface, respectively.

As shown in FIG. 18, for example, the direction toward which a metal line Mw2 in a meshed metallic layer Lp2 constituting a column electrode extends is set to a direction other than the horizontal direction, vertical direction, and diagonal 45° direction in the standard coordinate system C, where directions toward which row and column electrodes extend are the X and Y directions. Further, in the standard coordinate system C for example, a contour (pattern) Sp2 of the column electrode 72 and a contour (pattern) Dp2 of the dummy electrode 72d thereof are defined as shown in FIG. 19. Thus, in the rotated coordinate system C', the pattern Sp2 of the column electrode 72 extends in the diagonal direction with respect to the coordinate axes (X' axis and Y' axis) of the rotated coordinate system C' as shown in FIG. 19.

Such contours Sp2 and Dp2 of the column electrode 72 and the dummy electrode 72d thereof are overlaid on a pattern of the metallic line Mw2 of the meshed metallic layer Lp2 as shown in FIG. 20 to set a dividing region (division band) Db2 that divides a metallic line of a meshed metallic layer as shown in FIG. 21.

By removing the intersecting section of the pattern of the metallic line Mw2 of the meshed metallic layer Lp2 and the contour Sp2 of the column electrode 72, i.e., a region of the pattern of the metallic line Mw2 of the meshed metallic layer overlapping with the division band Db2 (graphic processing), the meshed metallic layer Lp2 is patterned just as in the contour Sp2 of the column electrode 72 to form the patterns Sp2 and Dp2 of the column electrode 72 and the dummy electrode 72d and 72e in a meshed structure.

However, as stated above, a cut (i.e., dividing line) formed on a pattern of the metallic line Mw2 of the meshed metallic layer Lp2 along the contour of the row electrode 72 would be formed along a direction other than the horizontal direction, vertical direction, and diagonal 45° direction with respect to the metallic line (mesh frame) Mw2 of the meshed metallic layer Lp2, and the length of the dividing section in the direction toward which the metallic line Mw2 extends would be different depending on the location where the contour of the column electrode 72 intersects with the metallic line (mesh frame) Mw2 of the meshed metallic layer Lp2.

FIG. 22 shows a pattern obtained by removing a region where the pattern of the metallic line Mw2 of the meshed metallic layer Lp2 overlaps with the division band Db2. As shown in FIG. 22, portions (intersecting portions) Cp1 and Cp2 where the contour Sp2 of the column electrode 72 intersects the metallic line (mesh frame) Mw2 of the meshed metallic layer Lp2 at a shallow angle, and a portion Cp3 where the contour Sp2 of the column electrode 72 intersects the metallic line (mesh frame) Mw2 of the meshed metallic layer Lp2 at a deep angle are created. As a result, when patterning the meshed metallic layer Lp2 in the shape of the column electrode 72, the width of the metallic line Mw2 of the meshed metallic layer Lp2 that is removed would be different depending on the location, i.e., the metallic line Mw2 is taken out over a wider range in the intersecting portions Cp1 and Cp2 in comparison to the intersecting portion Cp3. Thus, uneven shading would appear on the operation surface of a touch panel.

Furthermore, as shown in FIG. 23, the tip at a divided part of the metallic line Mw2 is thin at the portions Cp1 and Cp2 where the contour of the column electrode 72 intersects the metallic line (mesh frame) of the meshed metallic layer at a shallow angle. Thus, when the meshed metallic layer is actually patterned by etching, there is a problem in that a width We of a dividing section of the metallic line Mw2 after patterning the meshed metallic layer (FIG. 23(b)) widens to a width greater than a designed width Wd of the dividing section of the metallic line Mw2 (FIG. 23 (a)) because the tip at the divided part of the metallic line Mw2 is more prone to be etched in comparison to other portions.

Meanwhile, Patent Literature 2 discloses a touch panel in which a single meshed metallic layer is patterned to form a rhombus electrode. Patent Literature 2 describes that a dividing line made on a metallic line of a meshed metallic layer is oriented in the horizontal direction, vertical direction, or diagonal 45° direction with respect to the metallic line (mesh frame) of the meshed metallic layer.

However, in a touch panel in which a single layer of a meshed metallic layer is patterned to form rhombus sensor electrodes of a row electrode and a column electrode, when the touch panel is combined with a display device, it also becomes necessary to tilt a metallic line of the meshed metallic layer with respect to a pixel array in a direction other than the horizontal direction, vertical direction, and diagonal 45° direction of the pixel array in order to avoid moire that appears due to the positional relationship between the arrangement of the metallic line of the meshed metallic layer and the pixel arrangement of the display device. In other words, even for a case in which rhombus sensor electrodes of a row electrode and a column electrode and electrode connecting sections are constituted of a single layer of meshed conductive layer, the length of a portion removed from the metallic line of the meshed metallic layer for separating the rhombus sensor electrodes of the row electrode and the column electrode from the meshed metallic layer differs depending on the location as described above, whereby a problem of shading appearing on the surface of a touch panel occurs.

The present invention was conceived in order to solve the above-described issues. The objective of the present invention is to obtain: an input device, which can make areas of individual dividing sections of a conductive line uniform in a row electrode and a column electrode made by patterning a meshed conductive layer by forming the dividing sections on the conductive lines constituting the meshed conductive layer, and thereby suppress uneven shading due to the patterned meshed conductive layer from appearing on a touch operation surface for a touch operation or a proximity operation formed by the row electrode and the column electrode, resulting in enhancement of the visibility of an image on a display surface recognized through the touch operation surface; and electronic information equipment using such an input device.

Solution to Problem

An input device according to the present invention which comprises a plurality of meshed electrodes having a structure made by patterning a meshed conductive layer and detects an input operation by a change in capacitance between the meshed electrodes is provided, where the meshed conductive layer is constituted of a plurality of conductive lines forming a mesh, the conductive lines are divided at an intersecting section where the conductive lines intersect a contour of the meshed electrodes, and a direction of dividing the conductive lines at the intersecting section where the conductive lines diagonally intersect the contour of the meshed electrodes, is a direction matching a direction of width of the conductive lines such that an area of a dividing section traversing the conductive lines is minimal, thereby achieving the objective described above.

Preferably, in the input device according to the present invention, the plurality of meshed electrodes are configured such that a first direction toward which the first conductive line extends and a second direction toward which the second conductive line extends are set to a direction other than a horizontal direction, a vertical direction, and a diagonal 45° direction of a pixel array consisting of a plurality of pixels, based on an arrangement of the plurality of pixels constituting a display device for displaying an image.

Preferably, in the input device according to the present invention, the meshed conductive layer has, as the conductive lines, a plurality of first conductive lines which extend in a first direction and are disposed at certain intervals and a plurality of second conductive lines which extend in a second direction orthogonal to the first direction and are disposed at a certain interval, and a mesh of the meshed conductive layer has a square shape.

Preferably, in the input device according to the present invention, the input device comprises a first meshed conductive layer and a second meshed conductive layer as the meshed conductive layer, the plurality of meshed electrode comprises, a plurality of first meshed electrodes having a structure which extends along the horizontal direction of the pixel array and is made by patterning the first meshed conductive layer, and a plurality of second meshed electrodes having a structure which extends along the vertical direction of the pixel array and is made by patterning the second meshed conductive layer, the first meshed electrodes are constituted of a plurality of first electrode sections arranged along the horizontal direction of the pixel array, and a first connecting section for connecting adjacent first electrode sections, and the second meshed electrodes are constituted of a plurality of second electrode sections arranged along the vertical direction of the pixel array and a second connecting section for connecting adjacent second electrode sections.

Preferably, in the input device according to the present invention, the plurality of first meshed electrodes are formed on a first insulation member, the plurality of second meshed electrodes are formed on a second insulation member, and the first and second insulation members are bonded together such that the first electrode sections of the first meshed electrode and the second electrode sections of the second meshed electrode are alternately arranged.

Preferably, in the input device according to the present invention, a first dummy electrode section obtained by patterning the first meshed conductive layer is disposed at a portion of the first insulation member opposing the second electrode sections, and a second dummy electrode section obtained by patterning the second meshed conductive layer is disposed at a portion of the second insulation member opposing the first electrode sections.

Preferably, in the input device according to the present invention, a line width of the conductive lines constituting the meshed conductive layer is in the range of 1-10 μm, and the first electrode sections and the second electrode sections have a rhombus shape, and a dimension of the dividing section in a direction toward which the conductive lines extends is 40-50 μm.

A method of a manufacturing the input device according to the present invention is provided, comprising forming a conductive layer on an insulation substrate, and forming the plurality of meshed electrodes by applying selective etching processing on the conductive layer by using a photomask, thereby achieving the objective described above.

A method of manufacturing the input device according to the present invention is provided, comprising printing a conductive layer with a mesh structure having a predetermined pattern on an insulation substrate to form the plurality of meshed electrodes.

Electronic information equipment according to the present invention having an image display section for displaying an image and an information inputting section disposed on a display screen of the image display section for inputting information is provided, comprising the input device of claim 1 as the information inputting section.

Advantageous Effects of Invention

According to the present invention as described above, it is possible to realize: an input device, which can make areas of individual divided sections of a conductive line uniform at a row electrode and a column electrode made by patterning a meshed conductive layer by forming the divided sections on conductive lines constituting a meshed conductive layer, and thereby suppress uneven shading due to the patterned meshed conductive layer from appearing on a touch operation surface for a touch operation or a proximity operation formed by the row electrode and the column electrode, resulting in enhancement of the visibility of an image of a display surface recognized through the touch operation surface; a method of manufacturing the same; and electronic information equipment using such an input device.

BRIEF DESCRIPTION OF THE DRAWINGS

FIG. 1(a) shows an arrangement of electrodes of this touch panel. FIG. 1(b) shows a cross-sectional structure of this touch panel (portion at A1-A1' line of FIG. 1(a)).

FIGS. 2(a) and 2(b) show row electrodes and column electrodes formed on each insulation sheet substrate, respectively.

FIG. 3 is a diagram showing the positional relationship between the metallic lines of the meshed metallic layer and the ideal contour (division band) of the row electrode at portion R2a in FIG. 2(a), with the X axis direction (direction to which the row electrode extends) of the standard coordinate system C as the horizontal direction.

FIG. 4 is a diagram showing the positional relationship between the metallic lines of the meshed metallic layer and the ideal contour (division band) of the column electrode at portion R2b in FIG. 2(b), with the X axis direction (direction to which the row electrode extends) of the standard coordinate system C as the horizontal direction.

FIG. 5 shows a method of designing a mask pattern for creating the column electrode with a mesh structure shown in FIG. 4 by a photolithographic method.

FIG. 6 is a diagram showing a procedure for designing a mask pattern for creating the column electrode with a mesh structure shown in FIG. 4 by a photolithographic method.

FIG. 8(a) shows a divided part of a metallic line for an intersecting position of a metallic line of a meshed metallic layer and a contour of a column electrode, when forming the column electrode of this touch panel by patterning the meshed metallic layer. FIG. 8(b) shows the enlarged A8 portion of FIG. 8(a).

FIG. 9(a) shows a divided part of a metallic line for an intersecting position of a metallic line of a meshed metallic layer and a contour of a column electrode when forming the column electrode of this touch panel by patterning the meshed metallic layer. FIG. 9(b) shows the enlarged A9 portion of FIG. 9(a).

FIG. 14(a) shows an arrangement of electrodes of this touch panel. FIG. 14(b) shows a cross-sectional structure of this touch panel (portion at the A-A' line in FIG. 14(a)).

FIG. 15(a) and FIG. 15(b) show an arrangement of row electrodes and column electrodes in each sensor sheet, respectively.

FIG. 16(a) shows an arrangement of electrodes in this panel. FIG. 16(b) shows a cross-sectional structure of this touch panel (portion at B-B' line in FIG. 16(a)).

FIGS. 17(a) and 17(b) show row electrodes and column electrodes formed on each insulation sheet substrate, respectively.

FIG. 18 shows a pattern of metallic lines of a meshed metallic layer defined by the rotated coordinate system C', which is rotated by a predetermined angle with respect to the XY coordinate system C corresponding to a touch panel operation surface.

FIG. 19 shows a pattern of column electrodes and the dummy electrodes thereof defined by the XY coordinate system C of a touch panel operation surface in the rotated coordinate system C'.

FIG. 20 shows a state where a contour of a column electrode is overlaid on a pattern of metallic lines of a meshed metallic layer.

FIG. 21 shows the patterning of a dividing region (division band) for dividing a metallic line of a meshed metallic layer, determined by overlaying a contour of a column electrode on a pattern of the metallic line of the meshed metallic layer.

FIG. 22 shows a pattern obtained by removing a region where the pattern of the metallic line Mw2 of the meshed metallic layer overlaps with the division band Db2.

FIG. 23 is a diagram for explaining the issue in a touch panel discovered by the inventors of the present case. FIG. 23 shows the width of a dividing portion of the metallic line Mw2 after patterning the meshed metallic layer (FIG. 23(b)) in comparison to the designed width Wd of a dividing portion of the metallic line Mw2 (FIG. 23(a)).

FIG. 24 shows a shape after etching (FIG. 24(b)), in comparison to a designed shape (FIG. 24(a)), as a shape of the intersecting section of metallic lines.

FIG. 25 shows a state in which a division band of a meshed metallic layer overlaps with the intersecting section of metallic lines.

DESCRIPTION OF EMBODIMENTS

Figure 1:
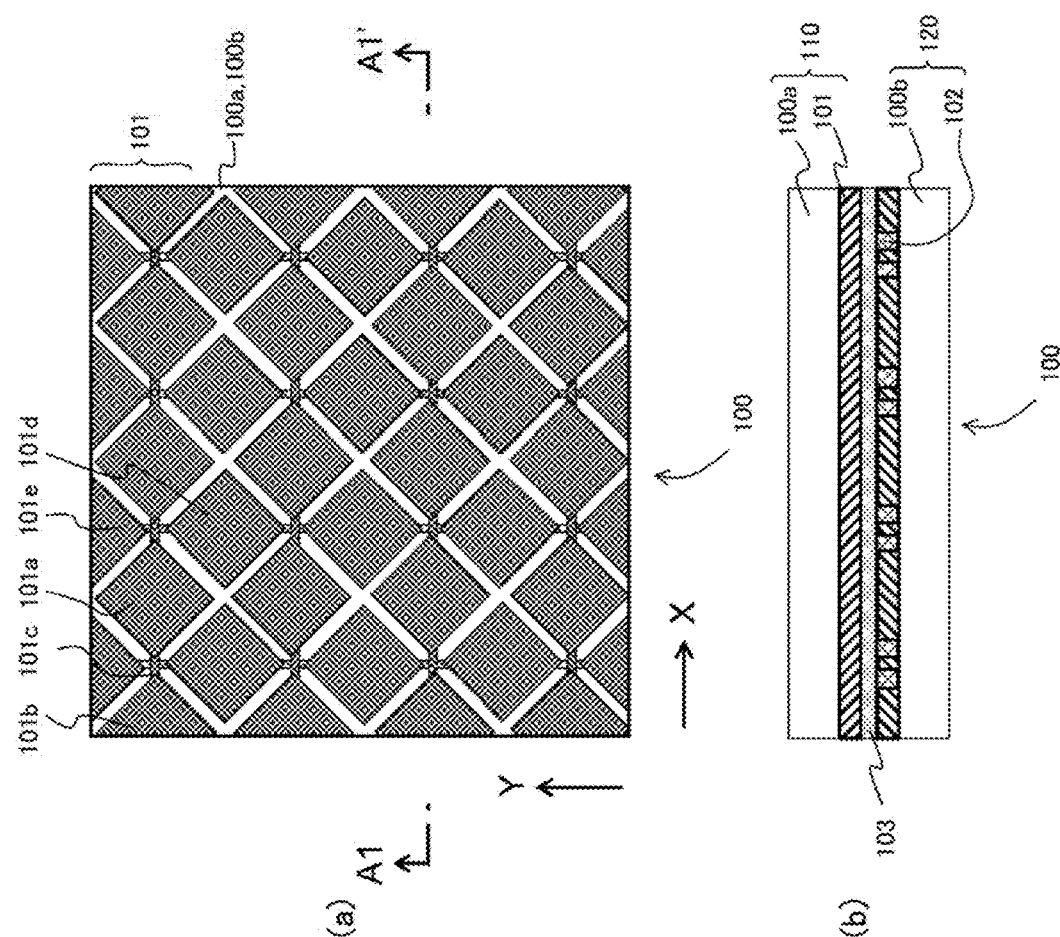
FIG. 1 is a diagram for explaining a capacitive touch panel as an input device according to Embodiment 1 of the present invention.

First, the basic principles of the present invention are explained.

The present invention is an input device having a row electrode and a column electrode made by patterning a meshed conductive layer by forming a dividing section on a conductive line (e.g., metallic line) constituting the meshed conductive layer (e.g., meshed metallic layer), wherein, at an intersecting section where the conductive lines constituting the meshed conductive layer diagonally intersect a contour of the meshed row electrode or the column electrode, the direction for dividing the conductive line at the intersecting section is set to the direction matching the direction of width of the conductive line such that the area of the dividing section traversing the conductive line is minimal.

The present invention with such a configuration can make areas of individual dividing sections of a conductive line uniform, to thereby suppress the appearance of uneven shading due to a patterned meshed conductive layer on a touch operation surface.

In the following explanation of Embodiments, an ideal contour of a meshed electrode (row electrode and column electrode) represents an ideal planar shape serving as the basis of the design of row and column electrodes. For example, as shown in the BACKGROUND ART and Embodiments (FIGS. 1-4), an ideal contour is intended to represent an outer edge line of a planar shape (planar pattern) of a row electrode or a column electrode, which is obtained by connecting a plurality of sensor electrodes arranged in a matrix (e.g., rhombus sensor electrodes and triangular sensor electrodes) in the row direction or the column direction.

Embodiments of the present invention include those in which a meshed conductive layer is not patterned just as in an ideal contour of a meshed electrode (row electrode and column electrode), but instead, a meshed conductive layer is patterned by dividing a conductive line such that there is no divided region overlapping with an intersection of the conductive lines thereof. In such an Embodiment, an ideal contour of a meshed electrode (row electrode and column electrode) is different from the actual contour, which is the contour of the meshed electrode (row electrode and column electrode) in an actual input device.

Hereinafter, Embodiments of the present invention are explained while referring to the drawings.

(Embodiment 1)

Figure 2:
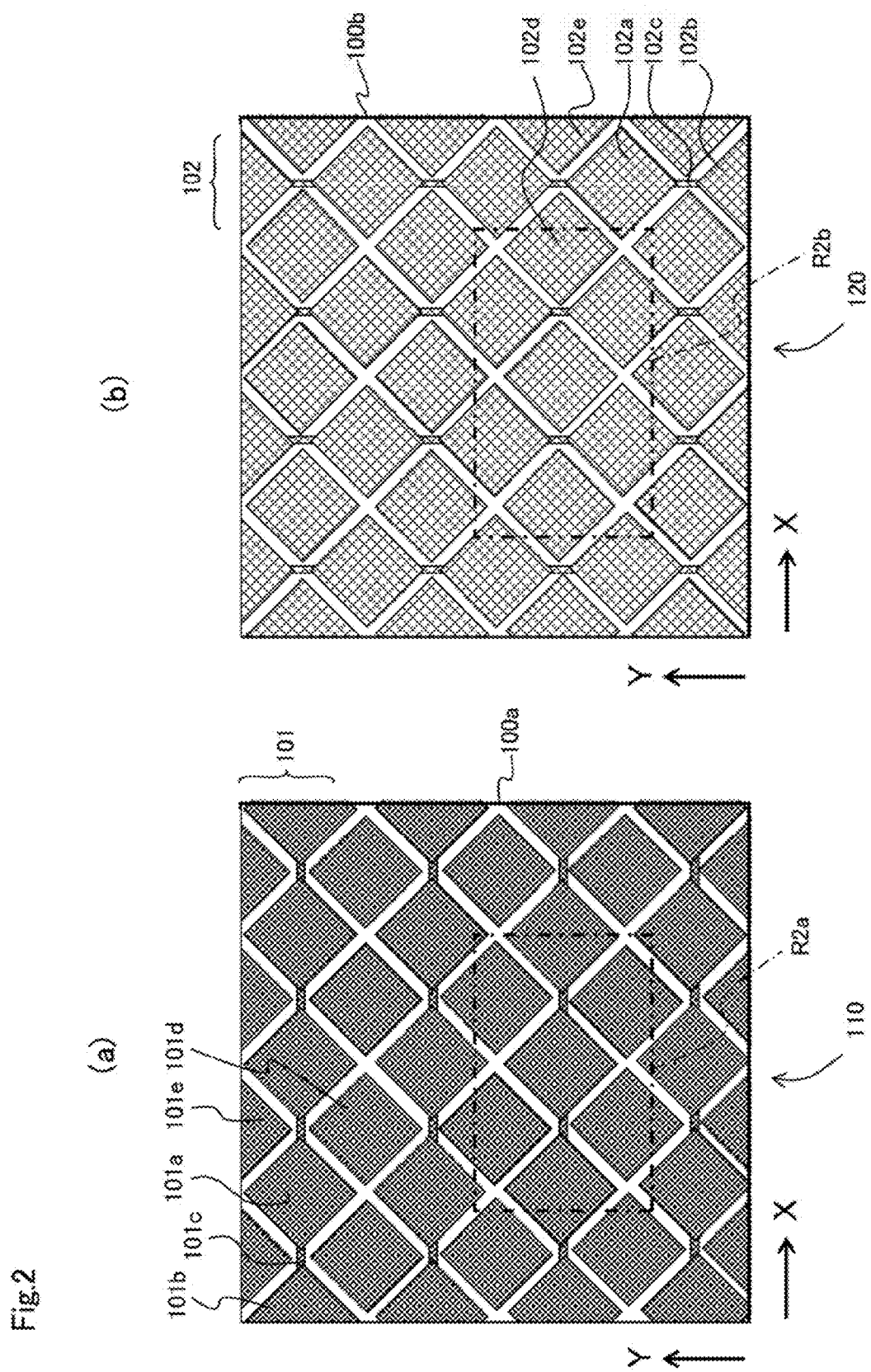
FIG. 2 is a diagram for explaining the capacitive touch panel as an input device according to Embodiment 1 of the present invention.

FIG. 1 and FIG. 2 are diagrams for explaining a capacitive touch panel as an input device according to Embodiment 1 of the present invention. FIG. 1(a) shows an arrangement of electrodes of this touch panel. FIG. 1(b) shows a cross-sectional structure of this touch panel (portion at A1-A1' line of FIG. 1(a)). FIGS. 2(a) and 2(b) show row electrodes and column electrodes formed on each insulation sheet substrate, respectively.

Figure 16:
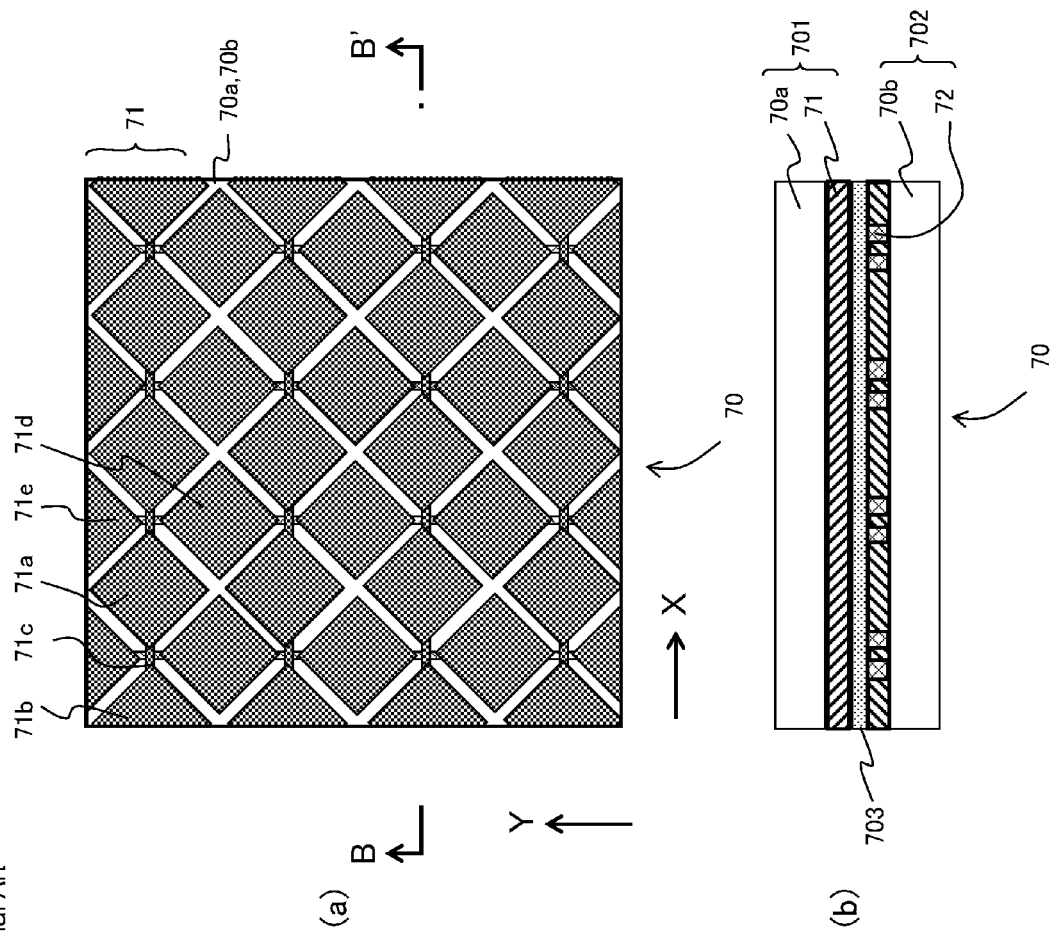
FIG. 16 is a diagram for explaining the touch panel disclosed in Patent Literature 1.
Figure 17:
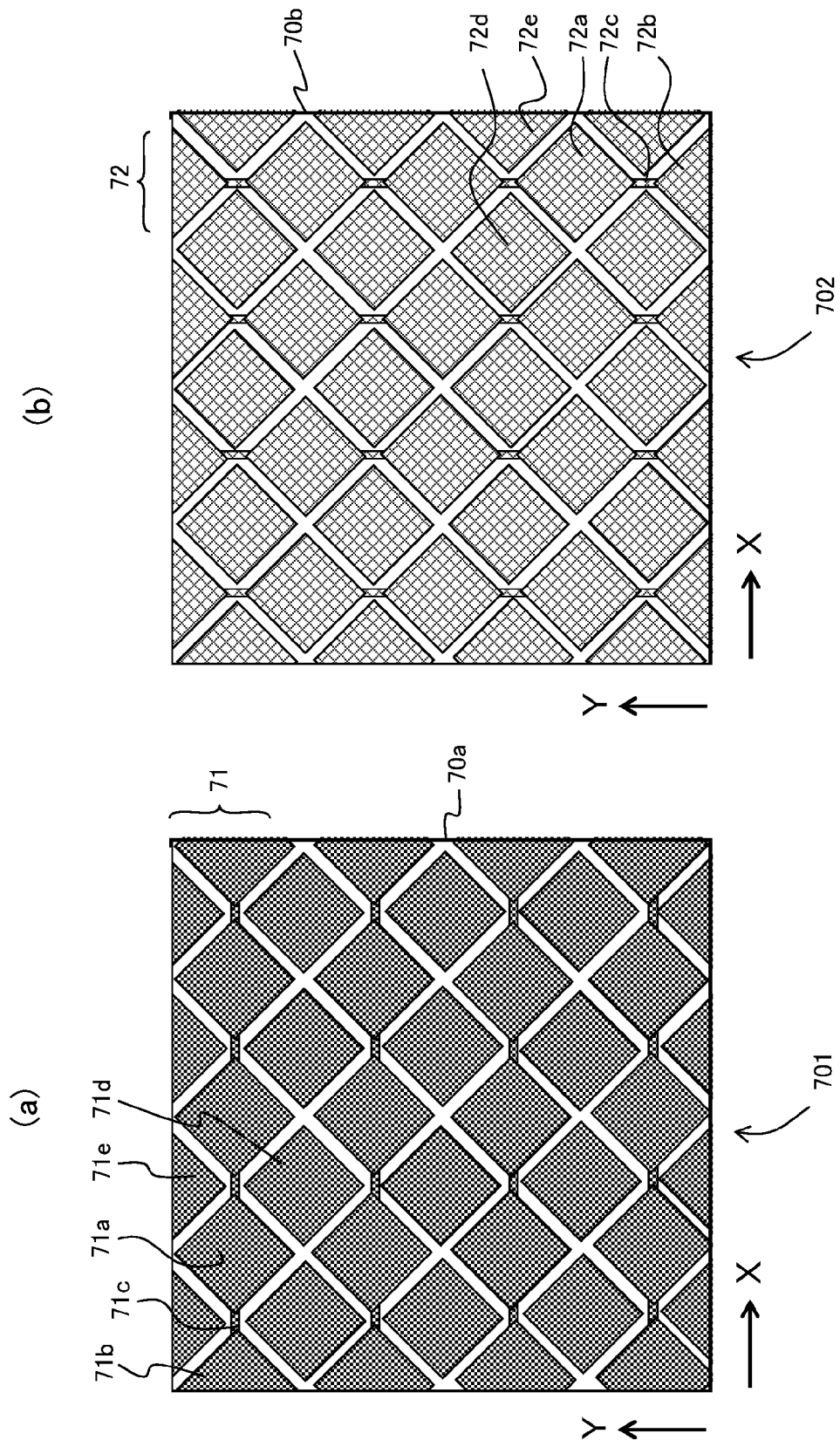
FIG. 17 is a diagram for explaining the touch panel disclosed in Patent Literature 1.

This touch panel 100 fundamentally has a configuration similar to that of the conventional touch panel 70 shown in FIGS. 16 and 17. In other words, the touch panel 100 has a first sensor sheet 110 made by patterning a meshed metallic layer (meshed conductive layer) formed on an insulation sheet substrate (insulation substrate) 100a consisting of a transparent insulation material such as PET, such that a row electrode (first meshed electrode) (X sensor) 101 is formed, and a second sensor sheet 120 made by patterning a meshed metallic layer (meshed conductive layer) formed on an insulation sheet substrate (insulation substrate) 100b consisting of a transparent insulation material such as PET, such that a column electrode (second meshed electrode) (Y sensor) 102 is formed. The touch panel has a structure in which the sensor sheets 110 and 120 are bonded together with a transparent insulation adhesive 103 such that each of the meshed metallic layers faces each other. However, it is not necessary to bond together the first and second sensor sheets 110 and 120 such that each of the meshed metallic layers faces each other. For example, the two sensor sheets 110 and 120 may be stacked together so that the insulation sheet substrates and meshed metallic layers are alternately laminated. For example, the two sensor sheets may be stacked such that a meshed metallic layer constituting the column electrode (second meshed electrode) 102 is positioned on the insulation sheet substrate 100b of the second sensor sheet 120, the insulation sheet substrate 100a of the first sensor sheet 110 is positioned thereon, and a meshed metallic layer constituting the row electrode (first meshed electrode) 101 is positioned thereon.

Herein, the row electrode 101 is made by electrically connecting a plurality of rhombus sensor electrodes (first electrode section) 101a and triangular sensor electrodes (first electrode section) 101b (hereinafter, simply referred to as sensor electrodes) arranged in a matrix on the insulation sheet substrate 100a along the row direction (X direction) with electrode connecting sections 101c (first connecting section). On the insulation sheet substrate 100a, a rhombus dummy electrode (first dummy electrode section) 101d and a triangular dummy electrode (first dummy electrode section) 101e that are electrically separated from the row electrode 101 are formed such that the dummy electrodes are positioned on a region other than the regions occupied by the sensor electrodes 101a and 101b constituting the row electrode 101. The triangular dummy electrode 101e is disposed on a peripheral edge section of the first sensor sheet 110, and the rhombus dummy electrode 101d is disposed on a region other than the peripheral edge section of the first sensor sheet 101.

Similarly, the column electrode 102 is made by electrically connecting a plurality of rhombus sensor electrodes (second electrode section) 102a and triangular sensor electrodes (second electrode section) 102b (hereinafter, simply referred to as sensor electrodes) arranged in a matrix on the insulation sheet substrate 100b along the column direction (Y direction) with electrode connecting sections 102c (second connecting section). On the insulation sheet substrate 100b, a rhombus dummy electrode (second dummy electrode section) 102d and a triangular dummy electrode (second dummy electrode section) 102e that are electrically separated from the column electrode 102 are formed such that the dummy electrodes are positioned on regions other than the regions occupied by the sensor electrodes 102a and 102b constituting the column electrode 102. The triangular dummy electrode 102e is disposed on a peripheral edge section of the second sensor sheet 120, and the rhombus dummy electrode 102d is disposed on a region other than the peripheral edge section of the second sensor sheet 102.

In this manner, in a structure in which the row electrode 101 and the column electrode 102 with a mesh structure are formed on the respective insulation sheet substrates 100a and 100b uniformity in the patterns of meshed metallic layers on individual insulation sheet substrates can be ensured by disposing a dummy electrode on a region other than the region where a row electrode or a column electrode is disposed on each insulation sheet substrate. For this reason, even if there is a dislocation in the bonding between the first sensor sheet 110 on which a row electrode is formed and the second sensor sheet 120 on which a column electrode is formed, since the pattern of the meshed metallic layer is uniform for each sensor sheet, the appearance of uneven shading can be suppressed.

Figure 14:
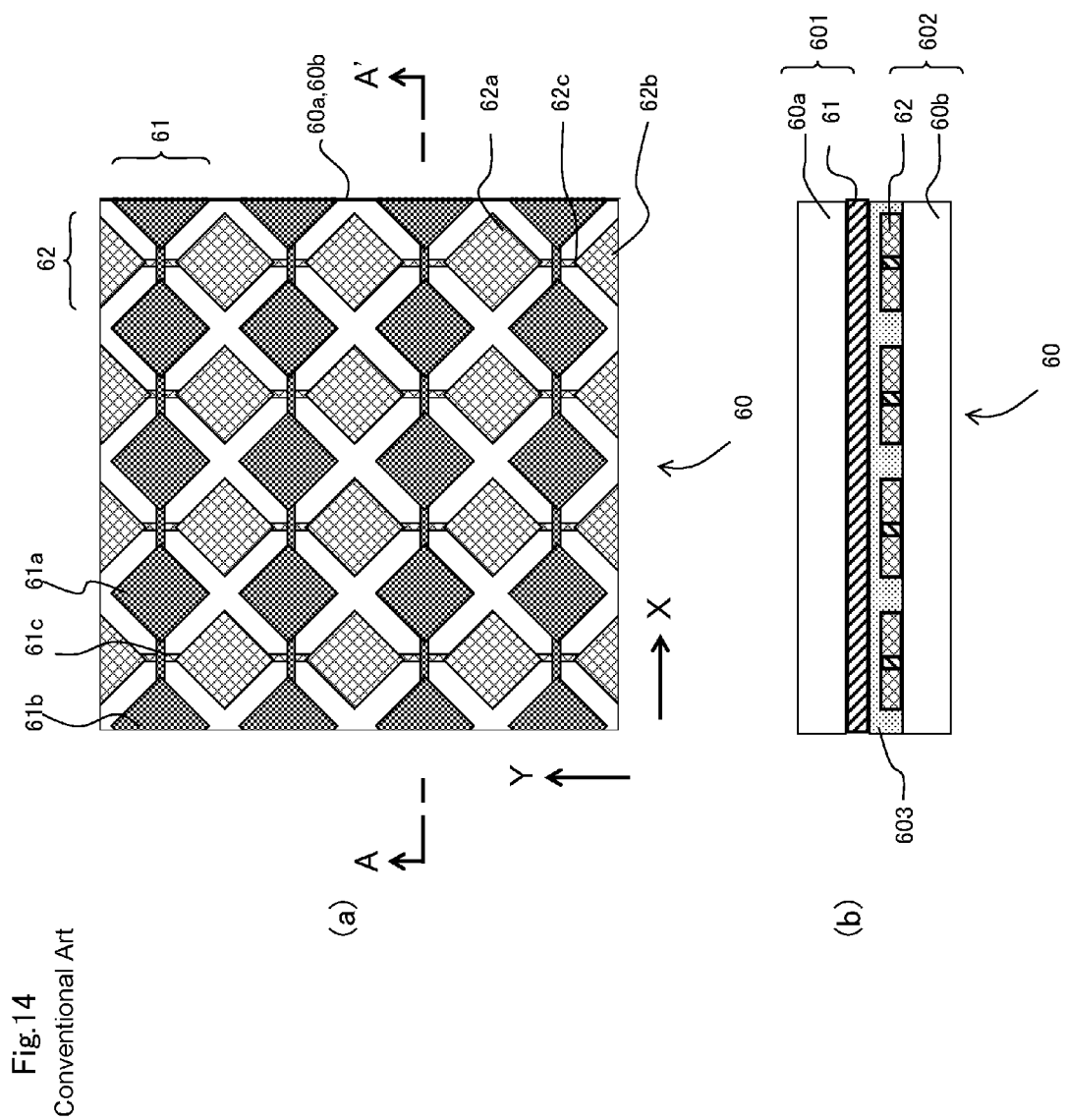
FIG. 14 is a diagram for explaining a touch panel with a structure in which two sensor sheets are bonded together as another example of a conventional touch panel.
Figure 15:
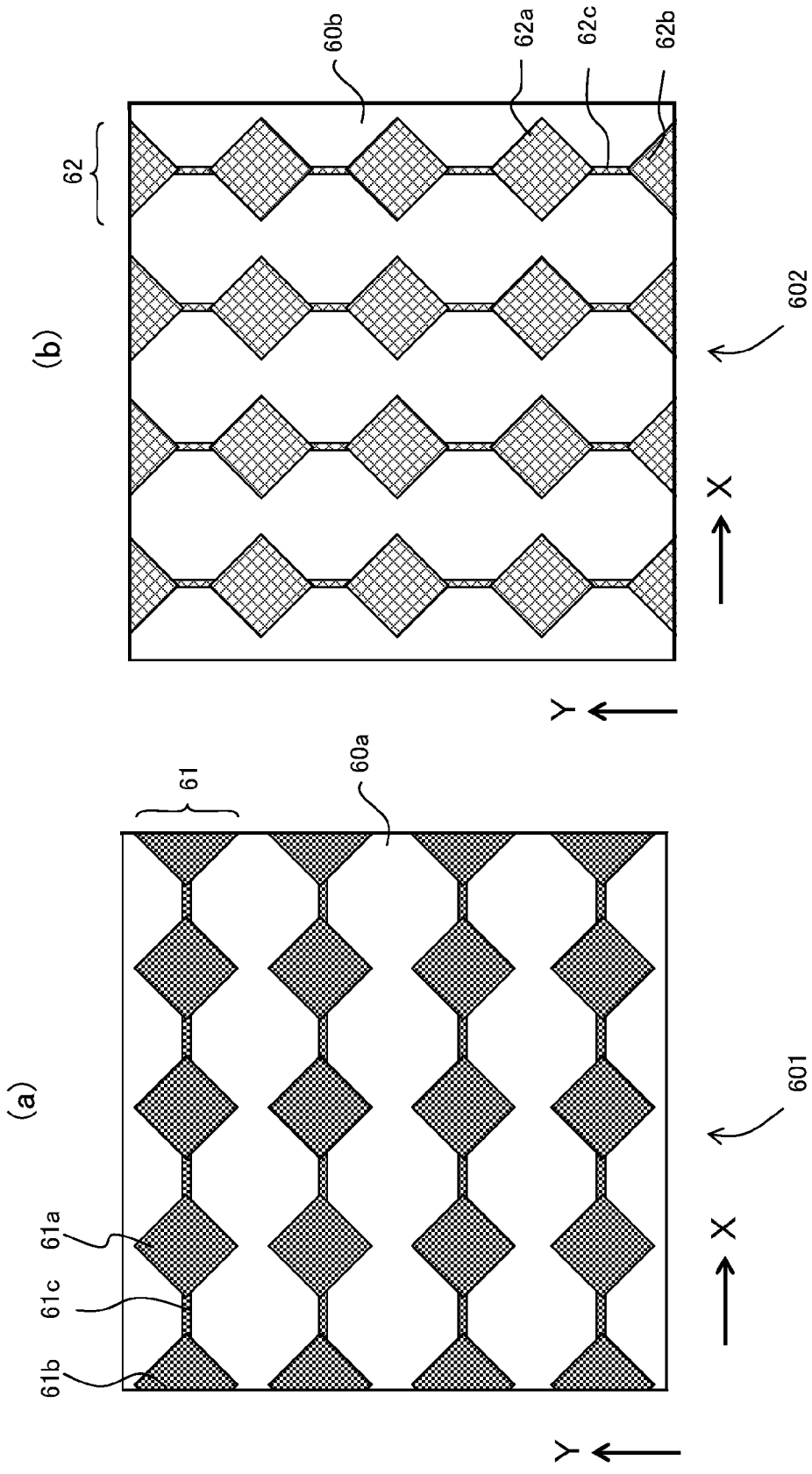
FIG. 15 is a diagram for explaining a sensor sheet constituting the capacitive touch panel shown in FIG. 14.

Herein, the meshed metallic layers have the same configuration as the meshed metallic layers in the conventional touch panel explained in FIGS. 14 and 15. In other words, the meshed metallic layers are structured such that a plurality of metallic lines extending in one direction and a plurality of metallic lines extending toward another direction intersect to form a square mesh. In addition, the meshed metallic layer constituting the row electrode 101 has the same structure in terms of design as the meshed metallic layer constituting the column electrode 102. However, the meshed metallic layer constituting the row electrode 101 and the meshed metallic layer constituting the column electrode 102 are configured such that the metallic lines of one of the sensor sheets are tilted with respect to the metallic lines of the other sensor sheet such that the angles of the metallic lines are not identical on the first sensor sheet 110 and the second sensor sheet 120 when both sensor sheets are stacked together. This is for suppressing moire from appearing when there is a dislocation in the bonding of the two sensor sheets.

Figure 3:
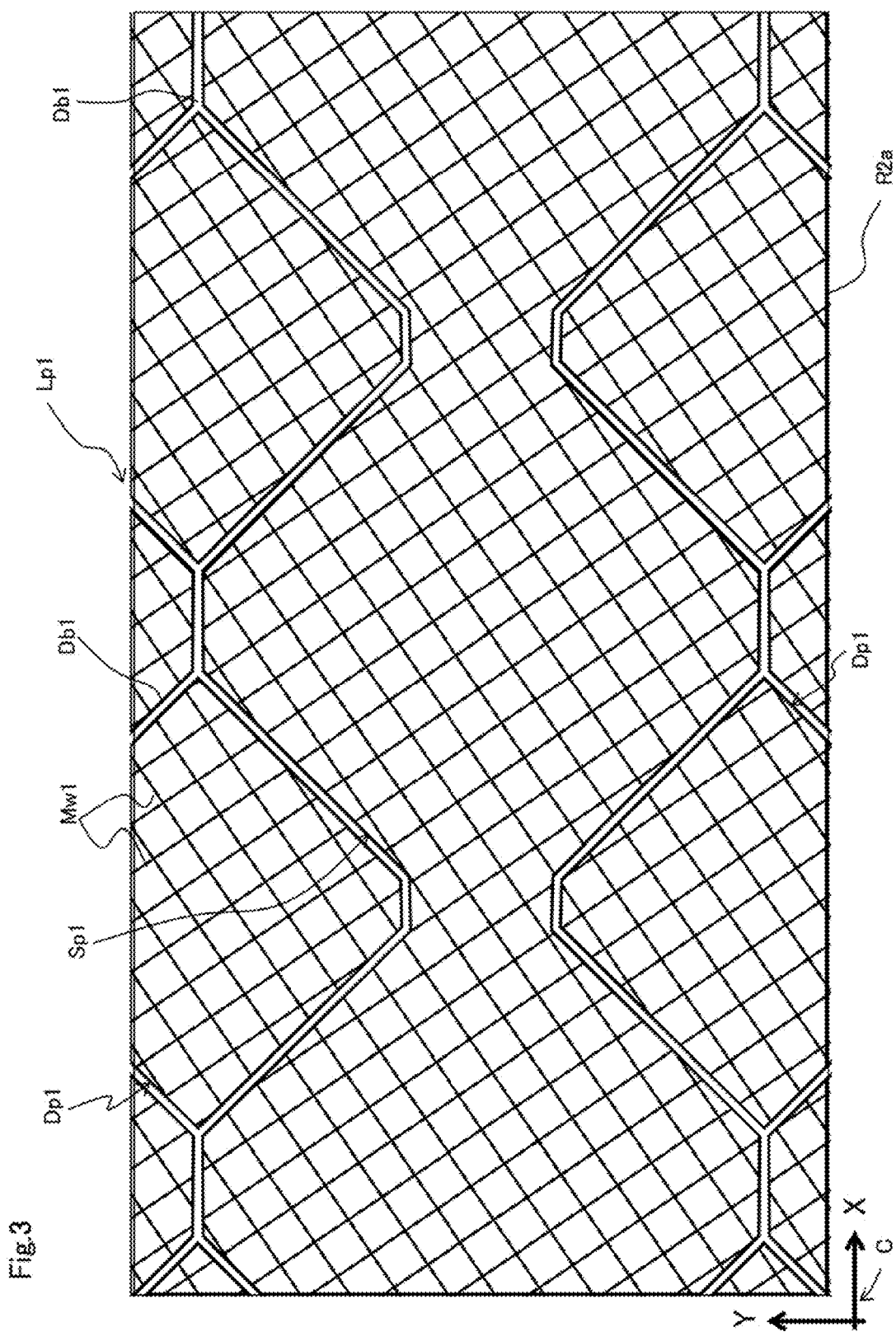
FIG. 3 is a diagram for explaining the capacitive touch panel as an input device according to Embodiment 1 of the present invention.
Figure 4:
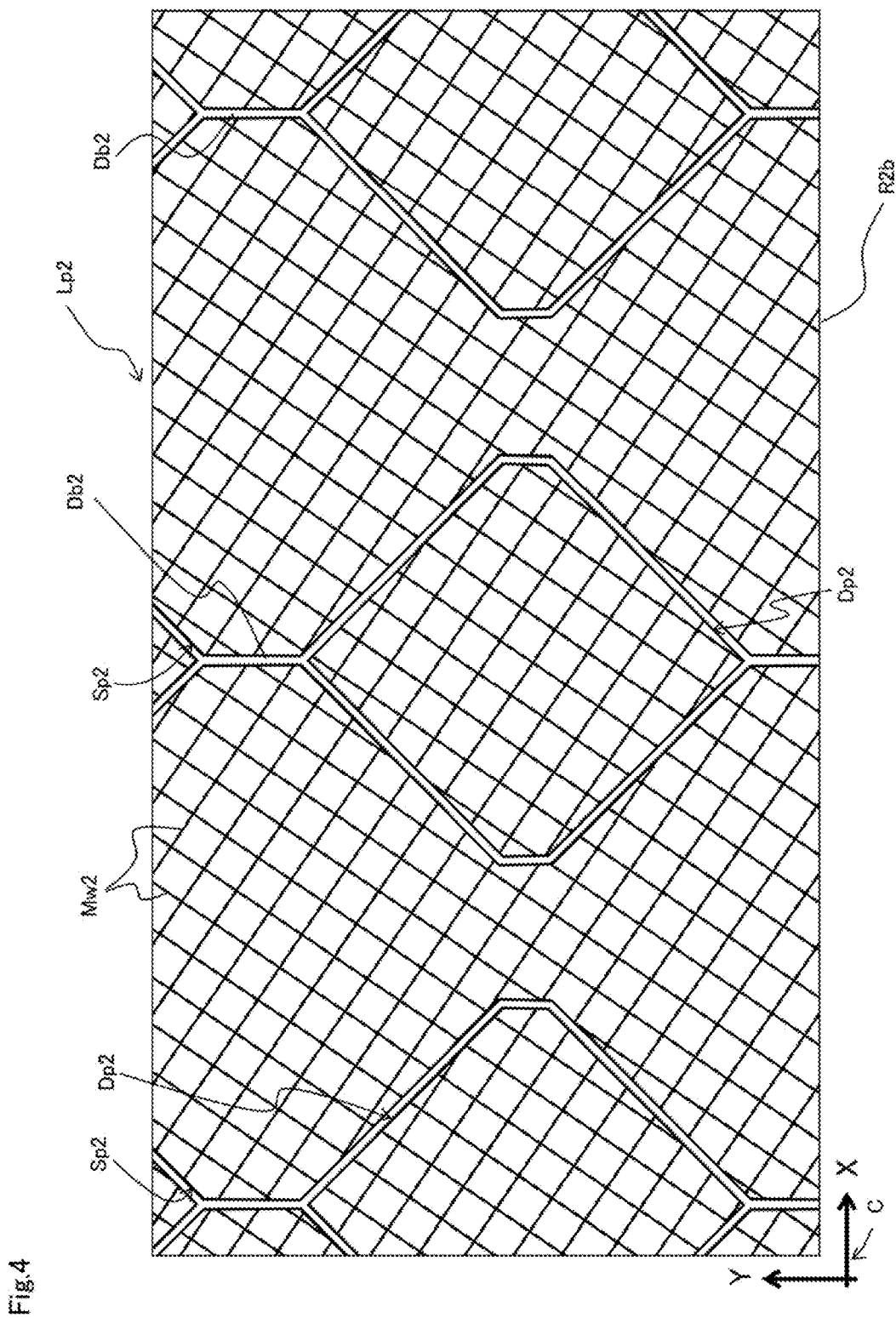
FIG. 4 is a diagram for explaining the capacitive touch panel as an input device according to Embodiment 1 of the present invention.

FIG. 3 shows the positional relationship between metallic lines Mw1 of a meshed metallic layer Lp1 and a division band Db1 along an ideal contour (division band) Sp1 of the row electrode 101 at portion R2a in FIG. 2(a), with the X axis direction (direction to which the row electrode extends) of the standard coordinate system C as the horizontal direction. FIG. 4 shows the positional relationship between metallic lines Mw2 of a meshed metallic layer Lp2 and a division band Db2 along an ideal contour Sp2 of the row electrode 102 at portion R2b in FIG. 2 (b), with the X axis direction (direction to which the row electrode extends) of the standard coordinate system C as the horizontal direction.

Herein, the ideal contours Sp1 and Sp2 are ideal patterns for the row electrode 101 and the column electrode 102, serving as the basis of design as planar shapes of the respective electrodes.

In other words, on the first sensor sheet 110, the division band Db1 is positioned along the ideal contour Sp1 of the row electrode 101 on the meshed metallic layer Lp1 where the direction of the metallic lines Mw1 is tilted in a direction other than the horizontal direction, vertical direction, and diagonal 45° direction in the standard coordinate system C. In principle, an intersecting section of the metallic line Mw1 and the division band Db1 is divided to pattern the meshed metallic layer Lp1 to form the row electrode 101 consisting of the sensor electrodes 101a, 101b and the electrode connecting section 101c, and the dummy electrodes 101d and 101e from the meshed metallic layer Lp1. In Embodiment 1, however, just as in the explanation for the column electrode 102 using FIG. 5, a mesh side section intersecting the ideal contour Sp1 of the row electrode 101, corresponding to one side of a mesh in the metallic line Mw1, is divided at a portion (dividing section) that does not overlap with an intersection Mcp of the metallic lines when the intersection Mcp of the metallic lines overlap with a portion to be divided in accordance with the ideal contour Sp1. Therefore, the actual contour of the row electrode 101 is formed slightly offset from the ideal contour Sp1 of the row electrode 101. The actual contour of the row electrode 101 is a planar pattern of the row electrode obtained by connecting the divided portions (dividing section) of the metallic line Mw1.

Further, on the second sensor sheet 120, the division band Db2 is positioned along the ideal contour Sp2 of the column electrode 102 on the meshed metallic layer Lp2 where the direction of the metallic lines Mw2 is tiled in a direction other than the horizontal direction, vertical direction, and diagonal 45° direction in the standard coordinate system C. In principle, an intersecting section of the metallic line Mw2 and the division band Db2 is divided to pattern the meshed metallic layer Lp2 to form the column electrode 102 consisting of the sensor electrodes 102a, 102b and the electrode connecting section 102c, and the dummy electrodes 102d and 102e from the meshed metallic layer Lp2. However, just as in the detailed explanation for the column electrode 102 using the following FIG. 5, a mesh side section intersecting the ideal contour Sp2 of the column electrode 102, corresponding to one side of a mesh in the metallic line Mw2, is divided at a portion (dividing section) that does not overlap with the intersection Mcp of the metallic lines when the intersection Mcp of the metallic lines overlaps with a portion to be divided in accordance with the ideal contour Sp2. Therefore, the actual contour of the column electrode 102 is formed slightly offset from the ideal contour Sp2 of the column electrode 102. The actual contour of the column electrode 102 is a planar pattern of the column electrode obtained by connecting the divided portions (dividing section) of the metallic line Mw2.

In addition, for the touch panel 100 of Embodiment 1, the direction for dividing the metallic lines Mw1 and Mw2 of the meshed metallic layers Lp1 and Lp2 such that the row electrode 101 and the column electrode 102 are formed by the patterning of the meshed metallic layers Lp1 and Lp2 is made coincident with the direction of the width of these metallic lines such that an area of a dividing section traversing the metallic lines Mw1 and Mw2 is minimal. For example, the dividing section of the metallic line Mw2 of the meshed metallic layer Lp2 constituting the column electrode 102 is, as shown in FIG. 5, set by disposing a square region Rs which is parallel to each side of the mesh of the meshed metallic layer Lp2 at an intersecting section of the metallic line Mw2 and the division band Dp2 or a position in the vicinity thereof.

Figure 5:
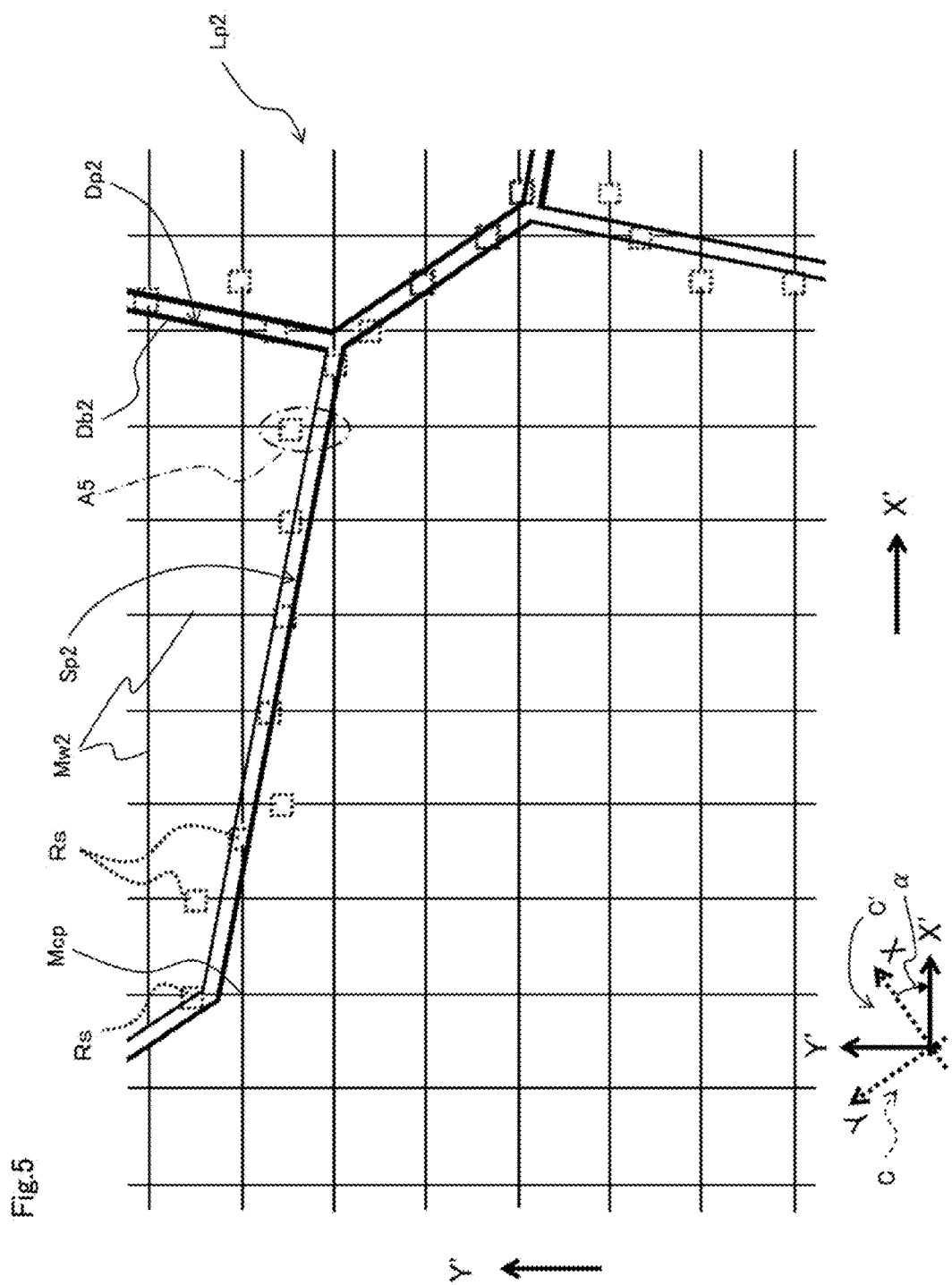
FIG. 5 is a diagram for explaining the capacitive touch panel as an input device according to Embodiment 1 of the present invention.

Further, when an intersecting position of the metallic line Mw2 of the meshed metallic layer and the ideal contour Sp2 of the column electrode is close to the intersection Mcp of the metallic lines as in section A5 in FIG. 5, the square region (dividing section) Rs is positioned with a separation of a certain distance such that the square region is not overlapped with the intersection Mcp of the metallic lines Mw2 and portions thicker than the portions other than the intersection section of metallic lines in the vicinity of the intersection of metallic lines. For example, as one criterion, the square region (dividing section) Rs is desirably disposed while securing about 2-3 times the distance from the intersection Mcp to the end of a portion swollen more than the line width of the metallic line (distance corresponding to half the dimension Wcp shown in FIG. 24(b)).

Figure 24:
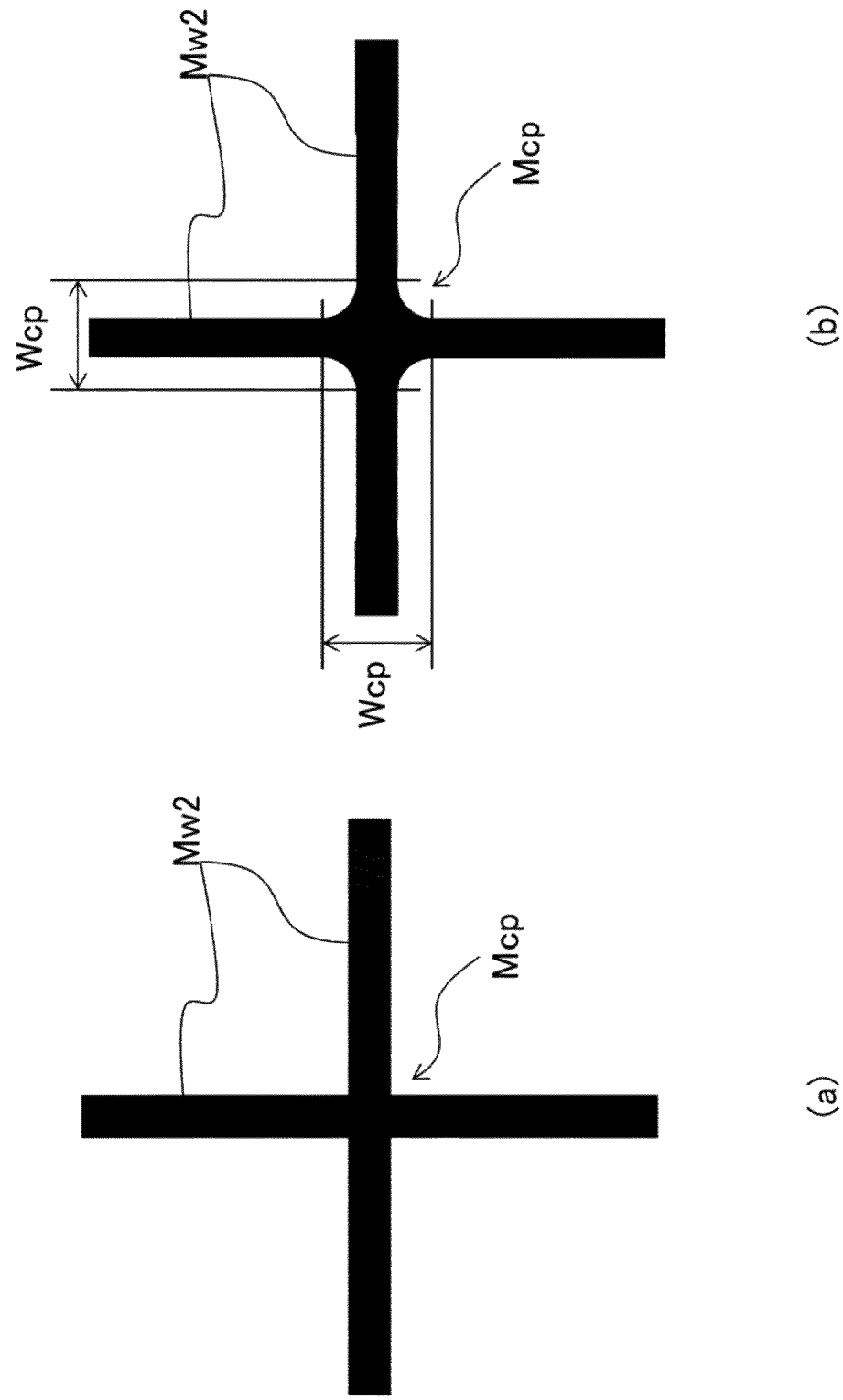
FIG. 24 is a diagram for explaining the effect of Embodiment 1 of the present invention.

Specifically, if the width Wcp (FIG. 24 (b)) of the portion thicker than the portion other than the intersecting section of metallic lines in the vicinity of the intersecting section of the metallic lines is for example 50 μm and the length of one side of the square region Rs is 40 μm, the center of the square region Rs needs to be separated at least 45 μm from the center of the intersection Mcp. However, it is desirable to separate about 100 μm.

In other words, with such a setting to separate the square region Rs from the intersection Mcp, a mesh side section intersecting the division band Db2 along the ideal contour Sp2 of the column electrode 102 is divided in actuality at a dividing section that does not overlap with the intersection Mcp of the metallic lines even when a portion that would be divided in accordance with the ideal contour Sp2 overlaps with the intersection Mcp of the metallic lines. Further, similarly for the row electrode 101, a mesh side section intersecting the division band Db1 along the ideal contour Sp1 of the row electrode 101, in actuality, is divided at a dividing section that does not overlap with the intersection Mcp of the metallic lines even when a portion that would be divided in accordance with the ideal contour Sp1 overlaps with the intersection Mcp of the metallic lines.

The working effect is explained hereinafter.

Figure 6:
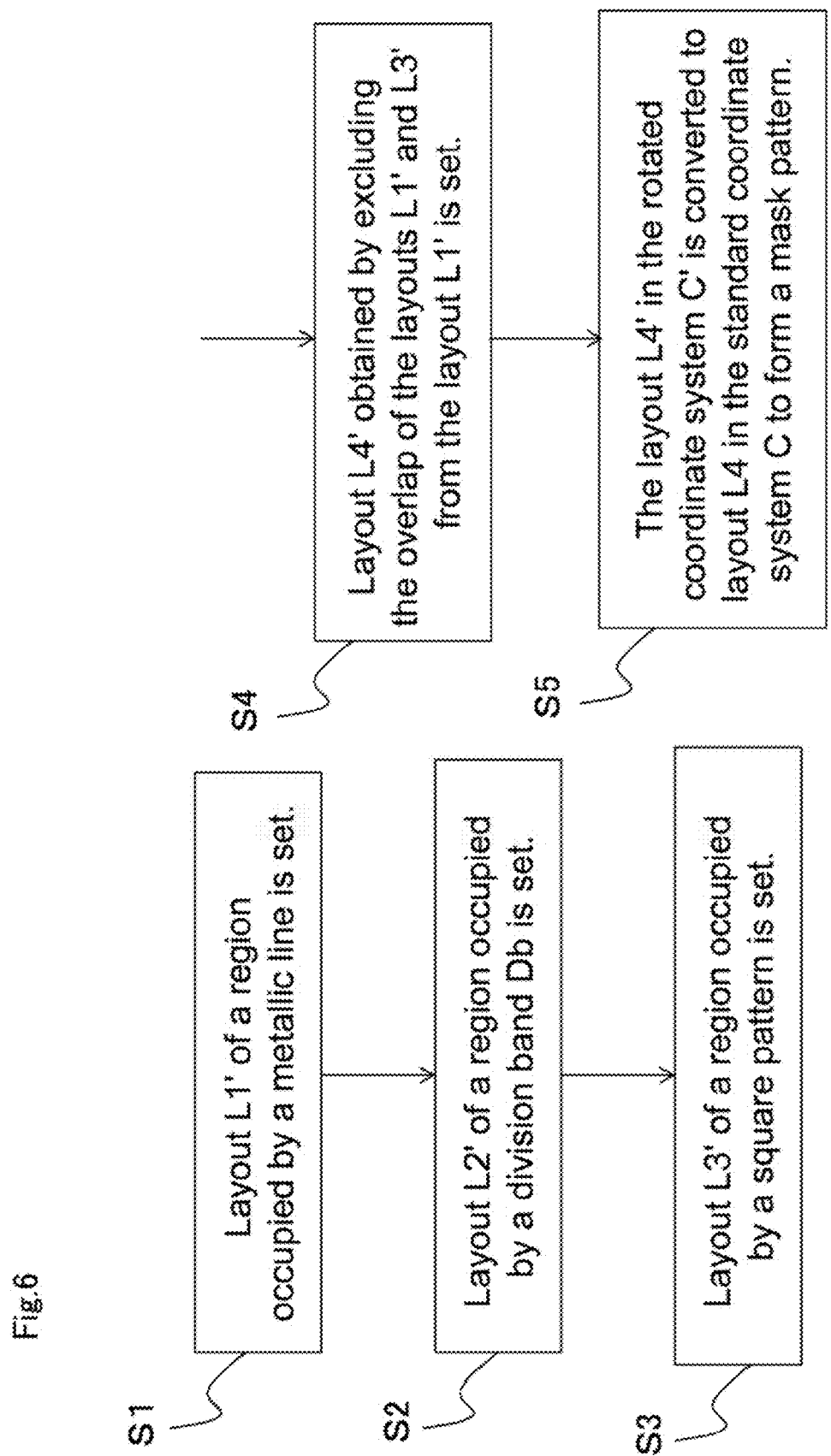
FIG. 6 is a diagram for explaining the capacitive touch panel as an input device according to Embodiment 1 of the present invention.

For example, a method of designing a mask pattern for creating, for example, the column electrode 102 with a mesh structure shown in FIG. 4 by selective etching of a conductive layer using a photolithographic method by using a computer-aided drafting device is explained by using FIGS. 5 and 6.

FIG. 5 shows a method of designing a mask pattern for creating the column electrode with a meshed structure shown in FIG. 4 by a photolithographic method.

FIG. 6 is a diagram showing a procedure for designing a mask pattern for creating the column electrode with a meshed structure shown in FIG. 4 by a photolithographic method.

Figure 18:
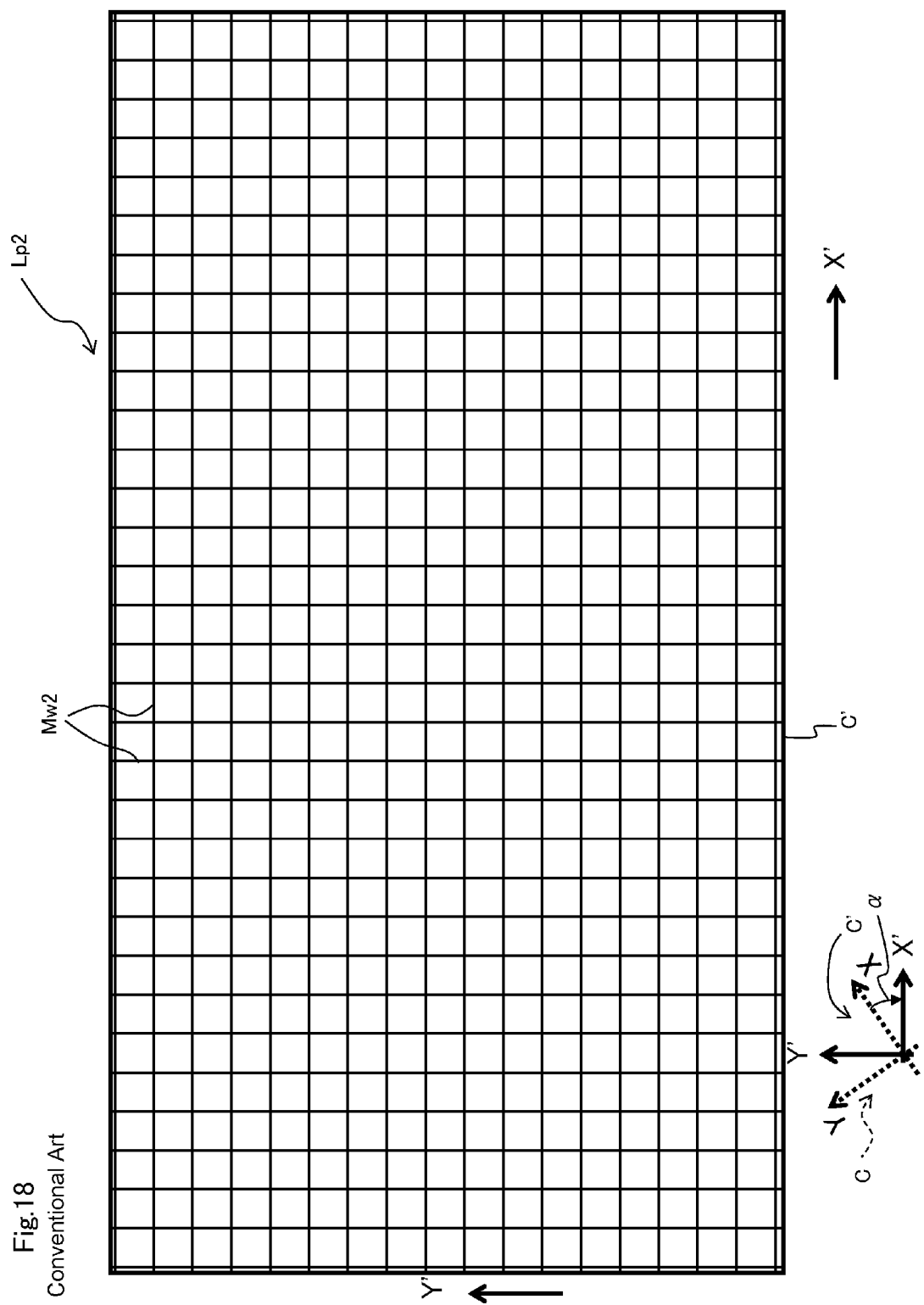
FIG. 18 is a diagram for explaining the issue in a conventional touch panel.
Figure 19:
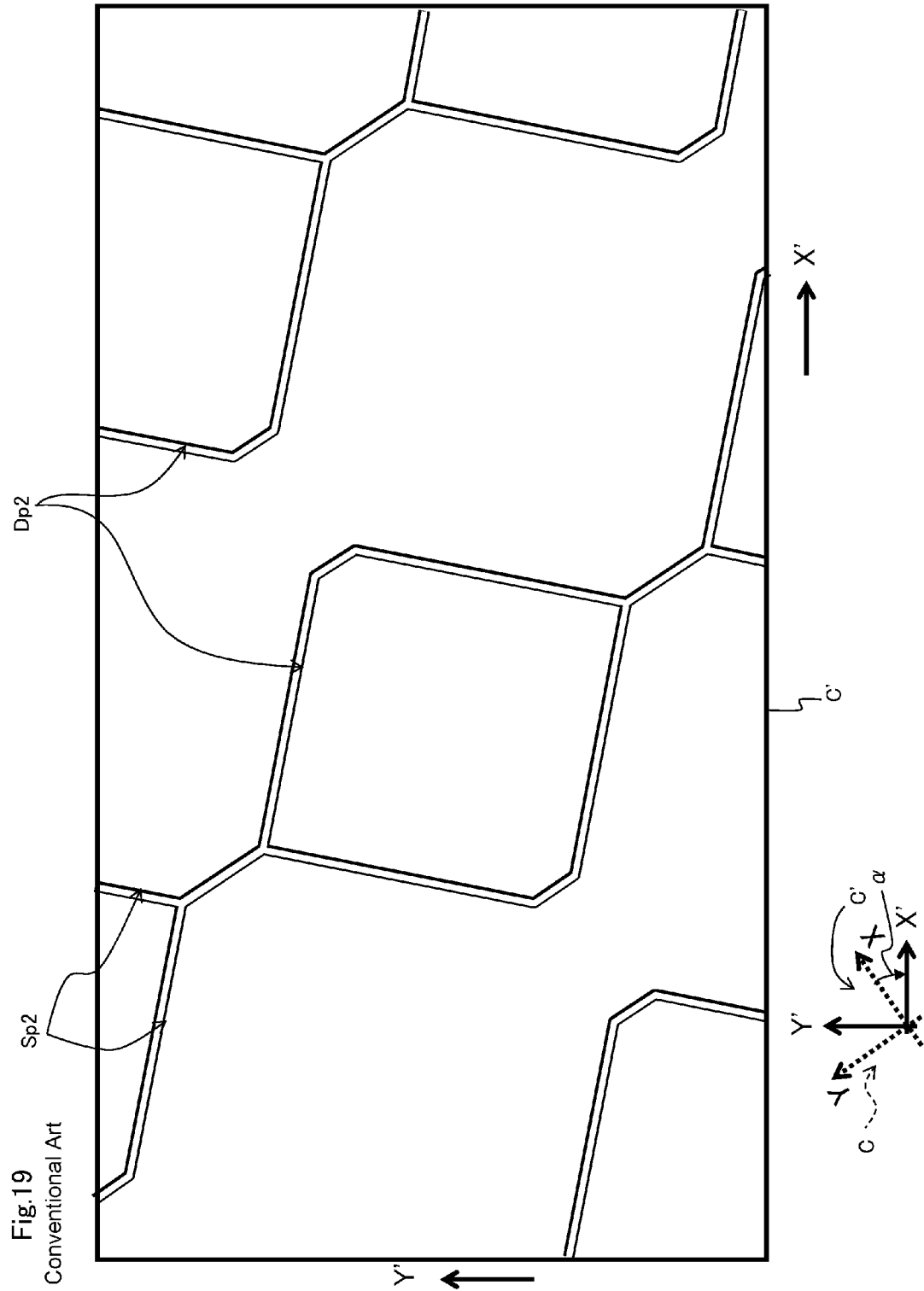
FIG. 19 is a diagram for explaining the issue in a touch panel discovered by the inventors of the present case.
Figure 20:
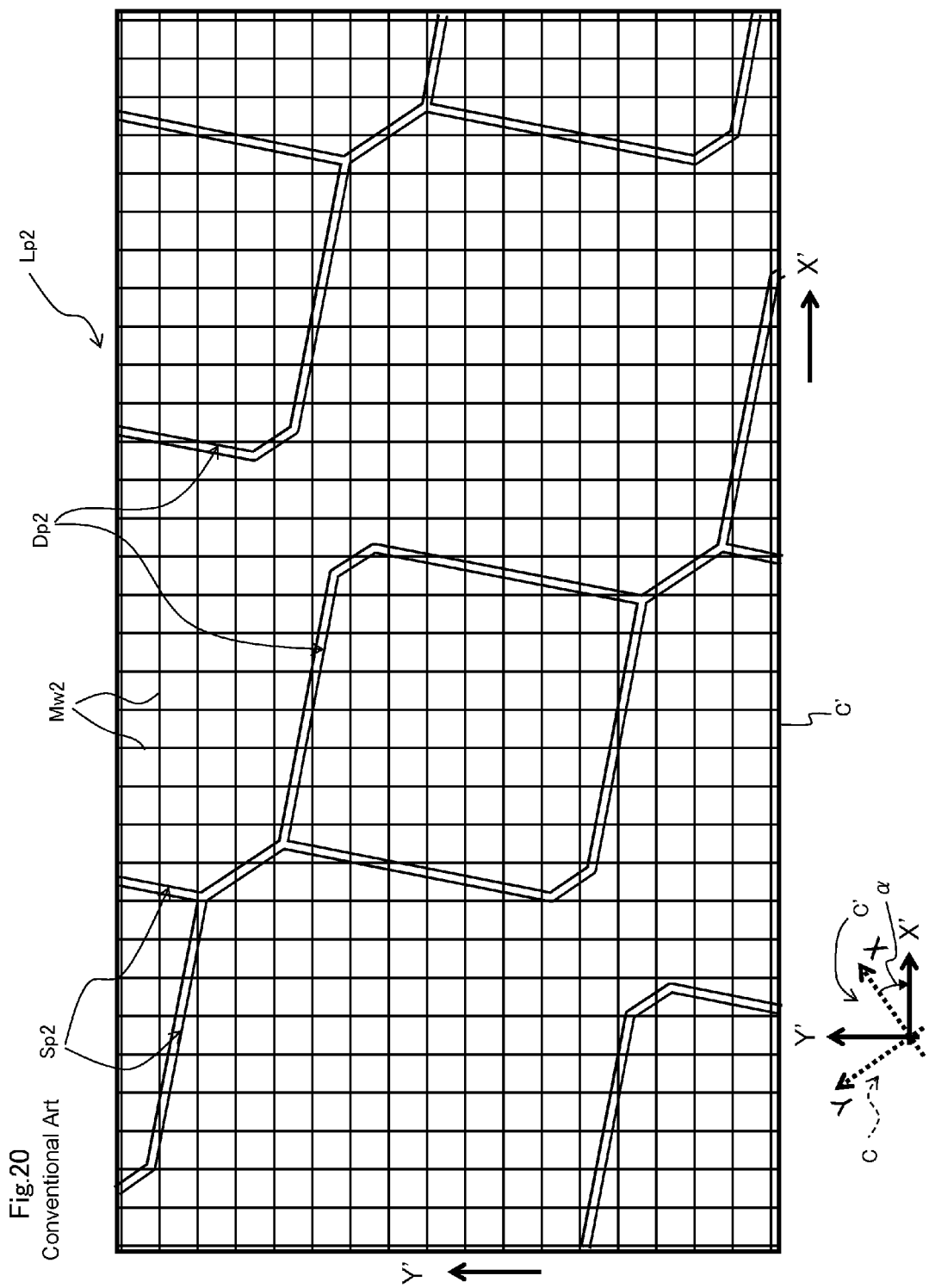
FIG. 20 is a diagram for explaining the issue in a touch panel discovered by the inventors of the present case.

First, while matching the orientation of the metallic lines Mw2 of the meshed metallic layer Lp2 to the horizontal direction and the vertical direction of a screen of a drafting device as shown in FIG. 5, i.e., in the rotated coordinated system C', which is the standard coordinate system C rotated to the right by only a predetermined angle α explained in FIG. 18, a layout L1' of a region occupied by the metallic lines Mw2 constituting the meshed metallic layer Lp2 is set (Step S1). The layout L1' corresponds to the pattern of metallic lines Mw2 in the meshed metallic layer Lp2 shown in FIG. 18.

Figure 21:
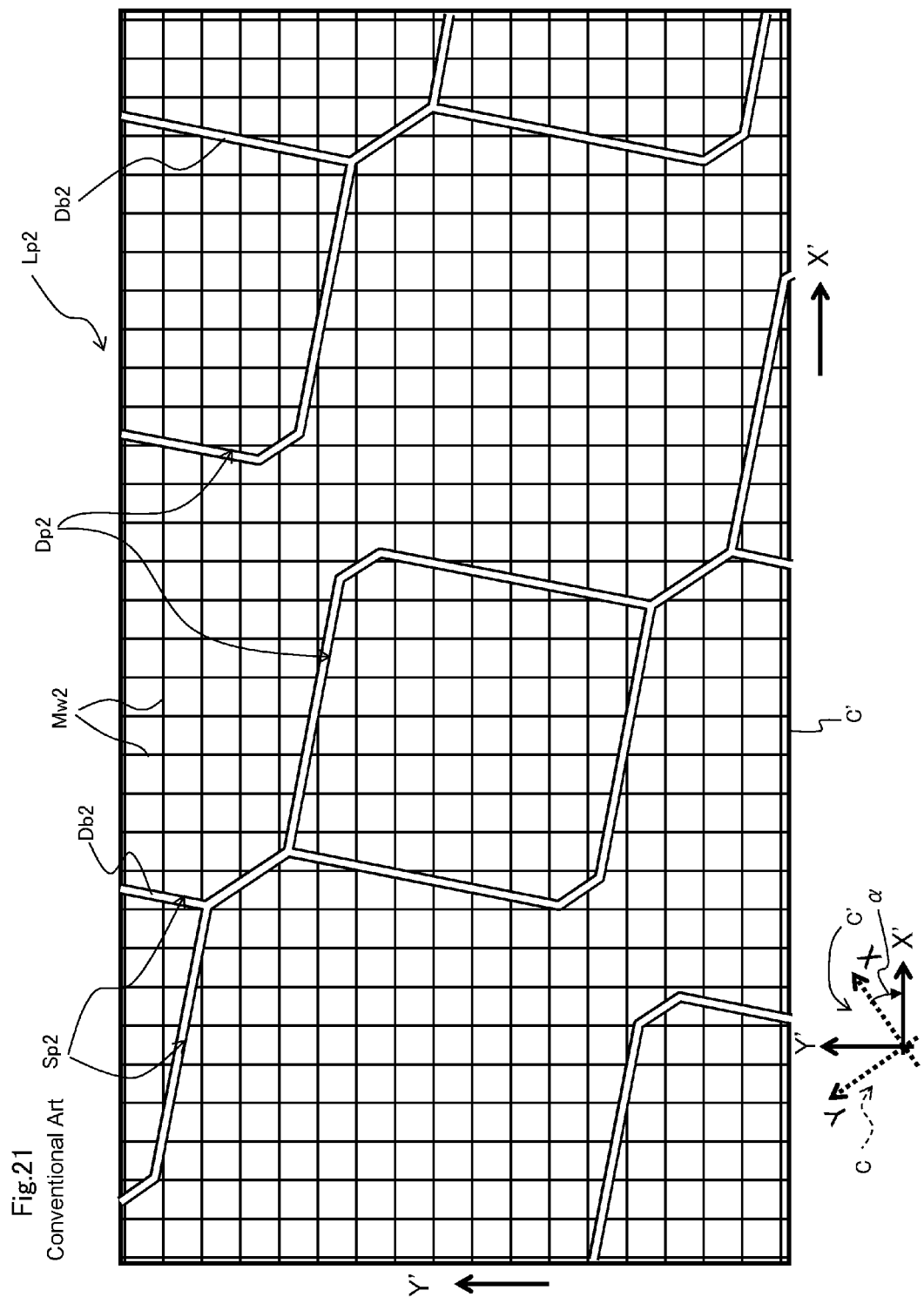
FIG. 21 is a diagram for explaining the issue in a touch panel discovered by the inventors of the present case.
Figure 22:
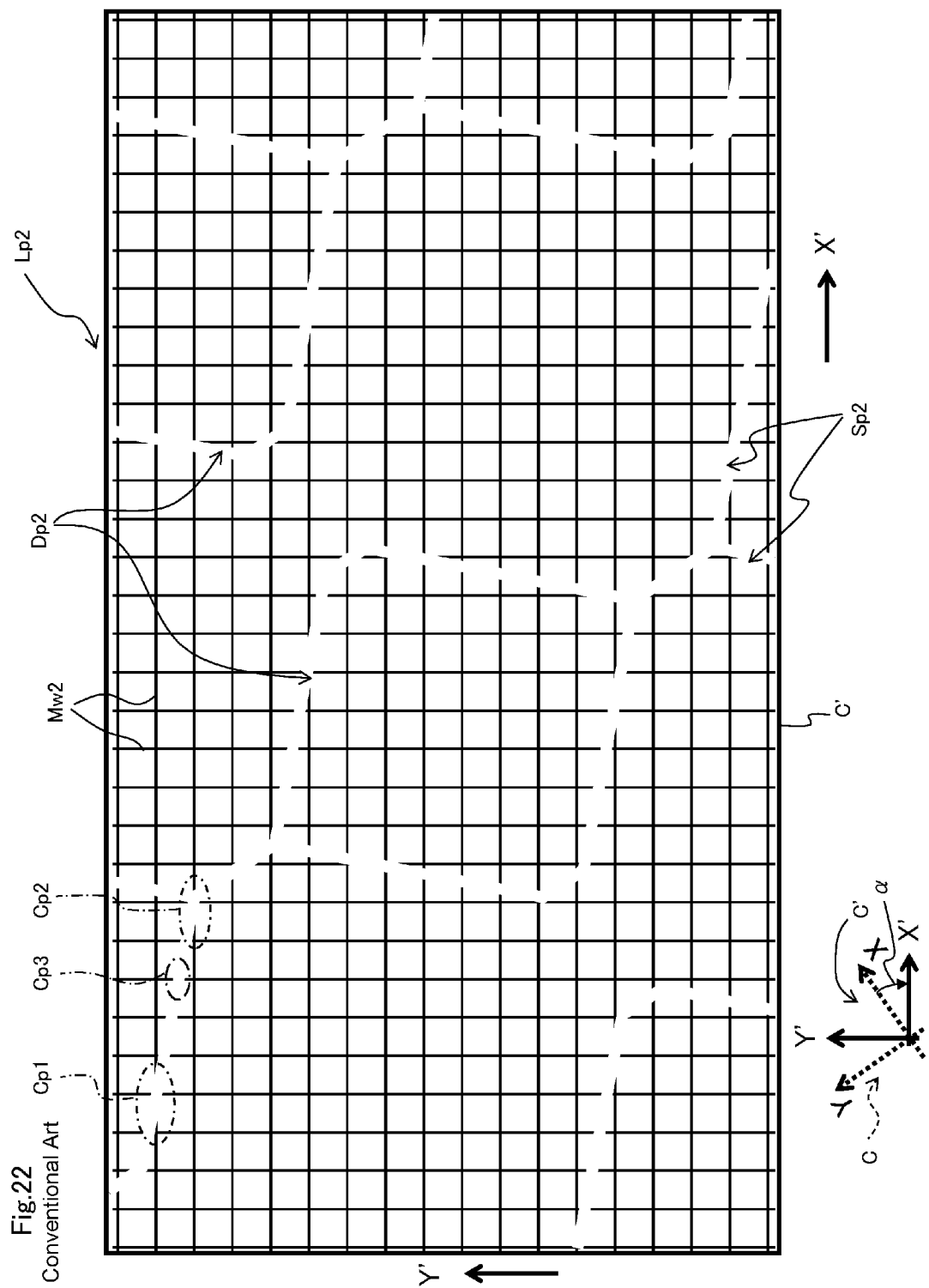
FIG. 22 is a diagram for explaining the issue in a touch panel discovered by the inventors of the present case.

Next, a layout L2' of a region occupied by the division band Db2 for patterning the meshed metallic layer Lp2 along the ideal contour Sp2 of a column electrode is set in the rotated coordinate system C' (Step S2). The layout L2' corresponds to the pattern of the division band Db2 along the contour (ideal contour) Sp2 of the column electrode shown in FIG. 21.

Next, a layout of an intersecting region where the region occupied by the division band Db2 and the region occupied by the metallic line Mw2 overlap is found by graphic processing of the layouts L1' and L2'. A square pattern prepared in advance is disposed at the intersecting region or a region in the vicinity thereof. Layout L3' of a region occupied by the square pattern (square region) Rs is set in the rotated coordinate system C' (Step S3).

The square region Rs is a dividing section for dividing a metallic line. The length of one side (e.g., 40 μm-50 μm) is set longer than the line width of the metallic line (1 μm-10 μm). In addition, the square region Rs is disposed such that one side of a square is parallel to one side of the mesh (i.e., direction toward which the metallic line Mw2 extends). Further, the size of one size of the mesh of the meshed metallic layer is about 500 μm. The dimensions thereof are preferably small. However, if too small, reliability decreases, and if too large, the ability to resolve a touched position decreases. Further, the square region (dividing section) Rs is positioned separated at a certain distance so as not to overlap with the intersection Mcp of the metallic lines Mw2 and a portion thicker than a portion other than the intersecting section of metallic lines in the vicinity of the intersection of the metallic lines.

Next, based on the layout L1' of the metallic lines and the layout L3' of the square region, a layout L4' of a region other than the portion where the region occupied by the metallic lines overlaps with the region occupied by the square region is set in the rotated coordinate system C' (Step S4), and the layout L4' is converted to a layout L4 in the standard coordinate system C to form a mask pattern defining an actual contour of the column electrode for patterning the column electrode with a mesh structure (Step S5). A mask pattern defining the actual contour of the row electrode for patterning the row electrode 101 with a mesh structure is formed in the same way as the aforementioned formation of a mask pattern for patterning the column electrode.

For example, a column electrode can be formed by using such a mask pattern.

As a brief explanation, first, a metallic layer of copper or the like is formed on the entire surface of the above-described insulation sheet substrate and a resist film is formed thereon. Patterns of a column electrode with a mesh structure and a dummy electrode thereof are then transcribed onto the resist film by exposing the resist film by using an exposure mask having the above-described mask pattern and by developing the resist film after the exposure. Thereafter, the resist film is used as an etching mask to selectively etch the above-described metallic layer to form the column electrode with a mesh structure and the dummy electrode thereof to create a second sensor sheet. A first sensor sheet having a row electrode can also be similarly formed.

Further, the first and second sensor sheets may be formed, instead of selective etching using a photoresist as described above, by printing onto an insulation sheet substrate a thin film metallic layer having a pattern corresponding to the pattern of the row electrode or the column electrode with a mesh structure and the dummy electrode thereof in advance.

Figure 7:
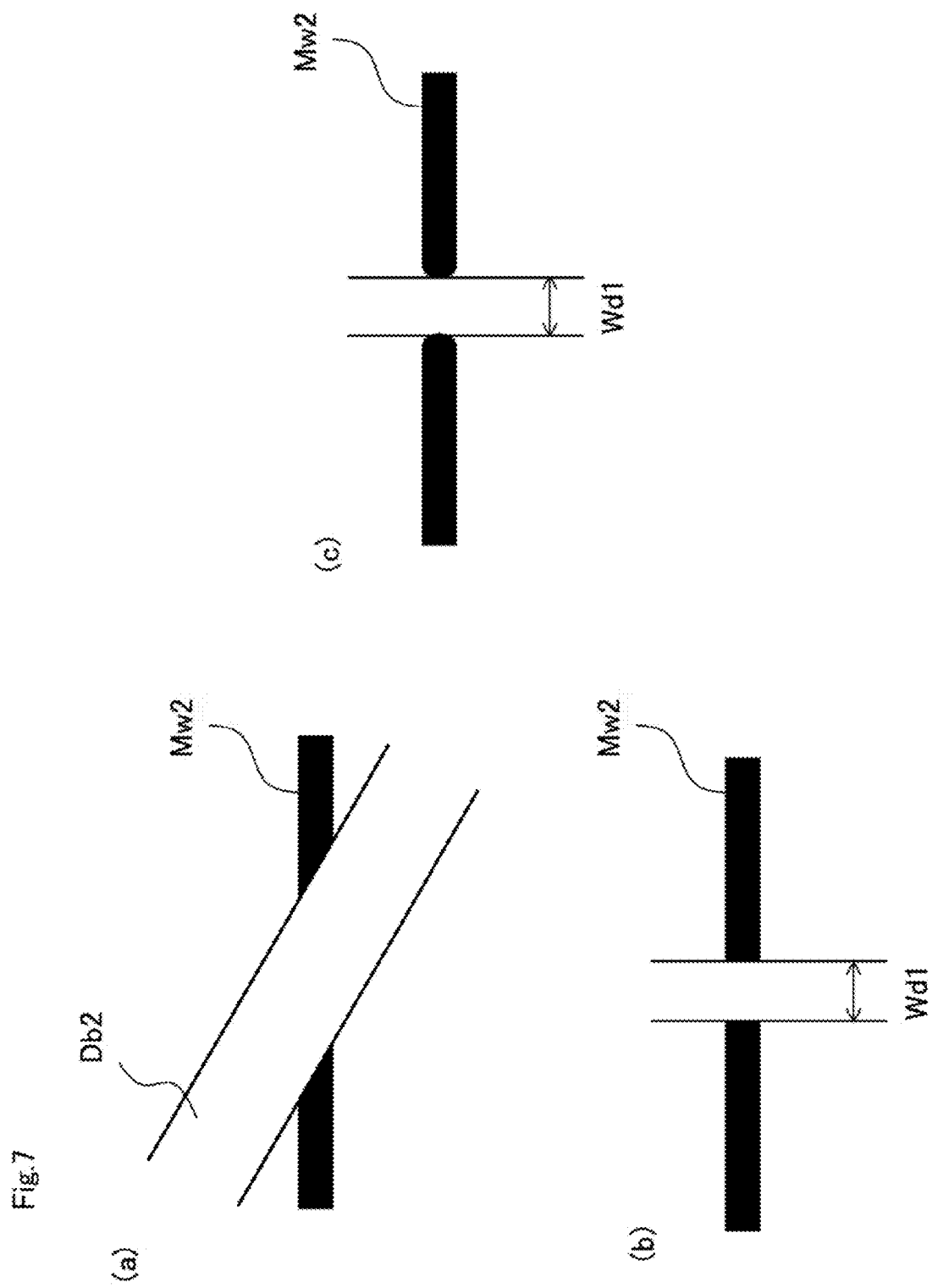
FIG. 7 is a diagram for explaining the effect of Embodiment 1 of the present invention.

In this manner, it is possible in Embodiment 1 to make an area of a dividing section of the metallic line Mw2 small, as a metallic line is divided for patterning row and column electrodes in a direction parallel to the width direction of the metallic line Mw2, even when the division band Db2 for patterning the row and column electrodes intersect the metallic line Mw2 constituting the meshed metallic layer at a shallow angle and the area of a portion where the metallic line overlaps with the division band is wide as shown in FIG. 7(a).

In addition, the direction of dividing a metallic line for patterning row and column electrodes is a direction parallel to the width direction of the metallic line in Embodiment 1. Thus, for example, even when the ideal contour (division band Db2) of the row electrode or column electrode intersects the metallic line Mw2 of the meshed metallic layer at a shallow angle as shown in FIG. 7(a), division is performed perpendicular to the metallic line. Hence, the tip at the divided part of the metallic line Mw2 would not be thin. For this reason, when an electrode with a mesh structure is actually formed by etching a metallic layer, it is possible to inhibit the tip at the divided part of the metallic line Mw2 from being prone to etching in comparison to other portions. In addition, a width Wd1 of a dividing section of the metallic line Mw2 after patterning the meshed metallic layer (FIG. 7(c)) can be just as almost be the designed width Wd1 of the dividing section of the metallic line Mw2 (FIG. 7(b)).

Further, a dividing section of a metallic line constituting a meshed metallic layer is formed at a location other than the intersecting section Mcp of the metallic line and the vicinity thereof in the touch panel of Embodiment 1. Thus, it is possible to avoid the intersecting section Mcp where the line width of metallic lines is thick and portions in the vicinity thereof from being removed when patterning the meshed metallic layer.

A supplementary explanation is provided for the effect. At an intersection Mcp of metallic lines Mw2 of a meshed metallic layer, the shape of the metallic lines Mw2 after etching (FIG. 24 (b)) has a swollen shape in comparison to the designed shape of the metallic lines Mw2 (FIG. 24(a)) due to the characteristic of etching a meshed metallic layer as shown in FIG. 24. This is because the ability to flow of an etching solution is low at the intersection Mcp of metallic lines Mw2 in the meshed metallic layer and the rate of etching decreases in comparison to portions other than the intersection of the metallic lines Mw2.

Figure 25:
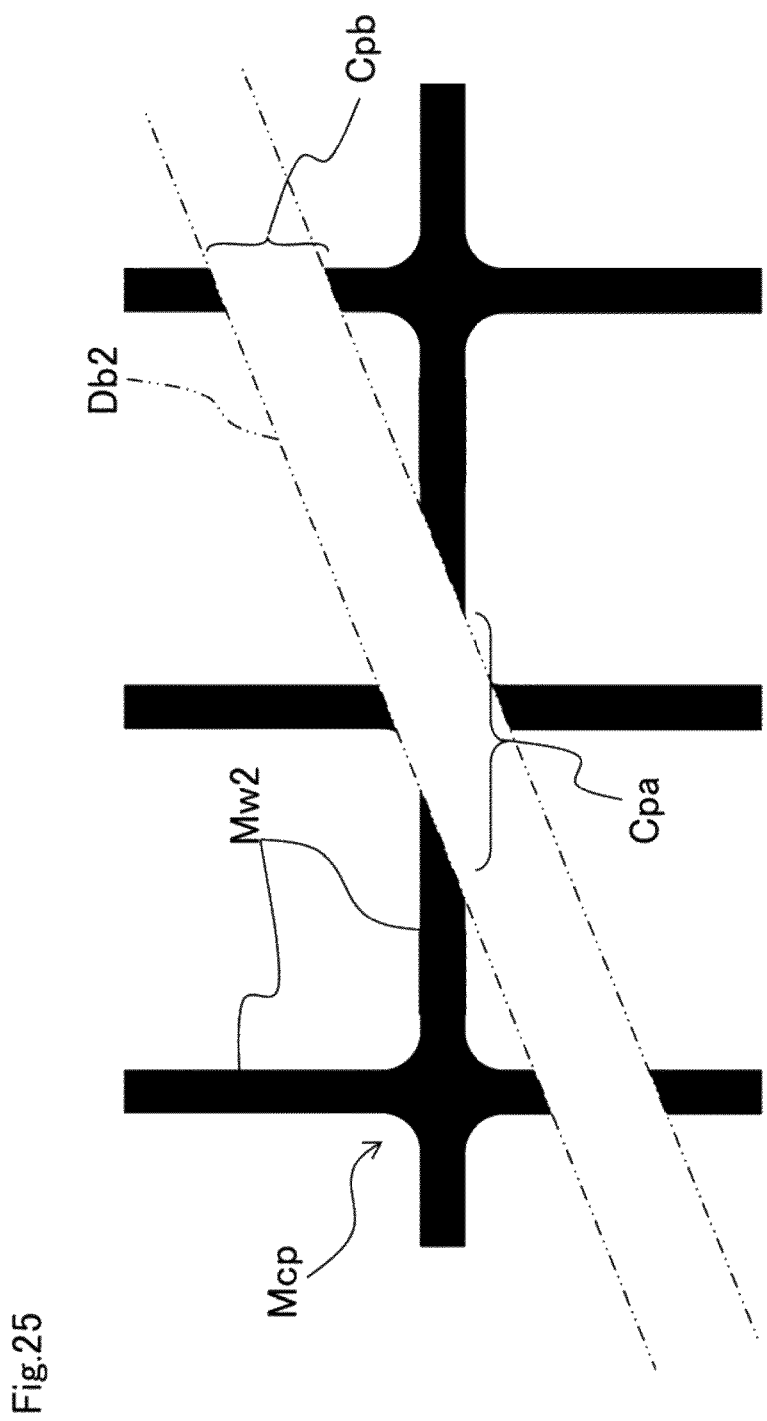
FIG. 25 is a diagram for explaining the effect of Embodiment 1 of the present invention.

For this reason, as shown in FIG. 25, when the division band Db2 dividing a meshed metallic layer overlaps with the intersection Mcp of the metallic lines Mw2, the metallic line of the meshed metallic layer is removed over a wider area at an intersection Cpa of metallic lines overlapping with the division band Db2 than at a portion Cpb, which is a portion other than the intersection of metallic lines overlapping with the division band Db2. This would become a cause of uneven shading appearing on the surface of a touch panel.

In contrast, it is possible to avoid the intersecting section Mcp and portions in the vicinity thereof, where the line width of metallic lines is thick, from being removed when patterning the meshed metallic layer, by disposing a dividing section of a metallic line constituting a meshed metallic layer away from the intersecting section Mcp of metallic lines and a portion where the line width is swollen at the vicinity thereof as in Embodiment 1.

Thereby, uneven shading appearing on the surface of a touch panel can be reduced.

In Embodiment 1, the dividing section of the metallic line Mw constituting the meshed metallic layer is formed at a location other than the intersecting section of metallic lines. However, when patterning is possible such that the line width at the intersecting section of the above-described metallic line Mw and the vicinity thereof does not widen in comparison to the line width at portions other than the intersecting section Mcp and the vicinity thereof, the dividing section of the metallic line constituting the meshed metallic layer, regardless of whether it is at the intersecting portion of metallic lines, may be set at a portion where the ideal contour of the row electrode or the column electrode overlaps with the metallic line.

(Embodiment 2)

Figure 8:
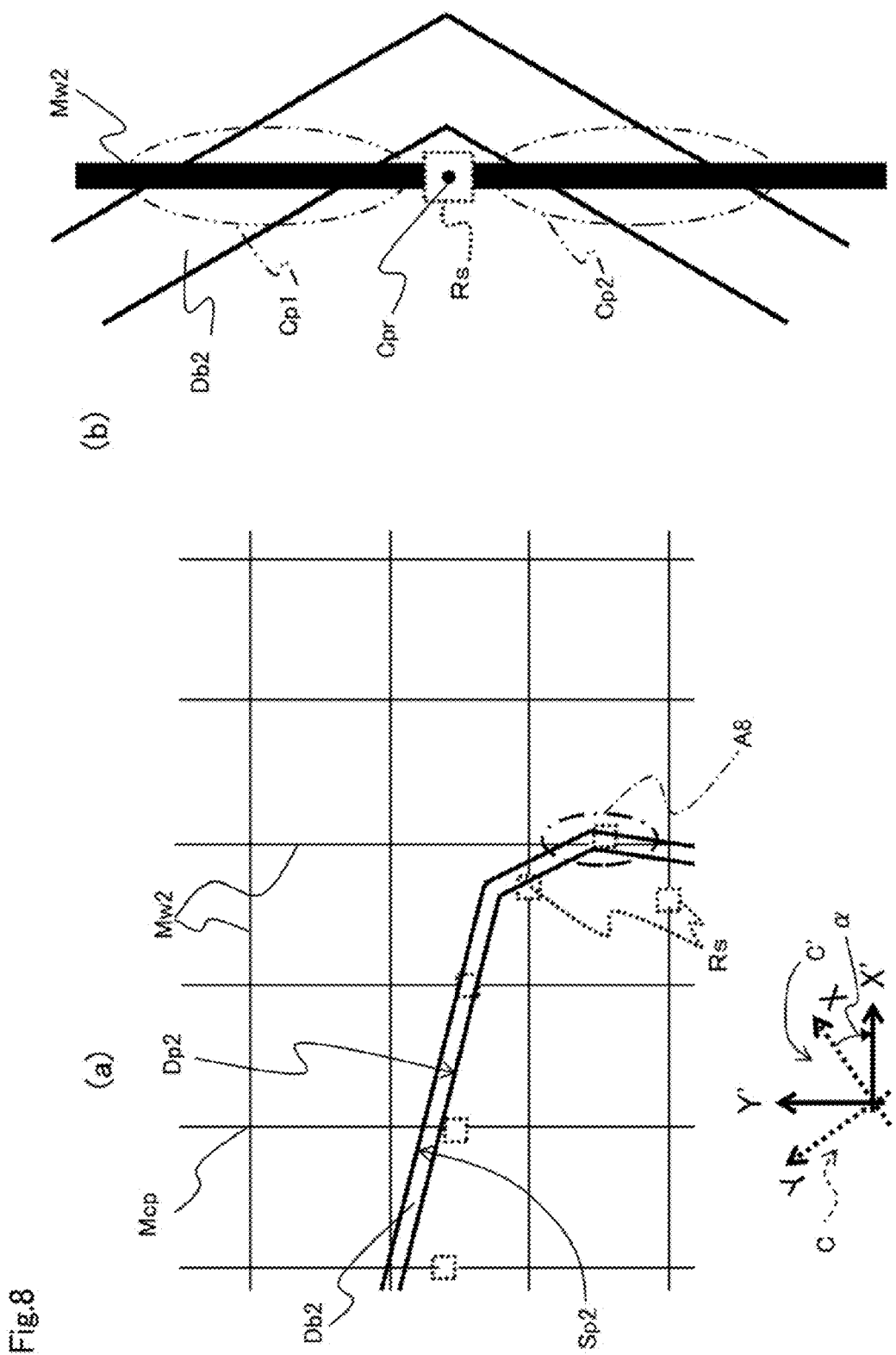
FIG. 8 is a diagram for explaining a capacitive touch panel that is an input device according to Embodiment 2 of the present invention.

FIG. 8 is a diagram for explaining a capacitive touch panel as an input device according to Embodiment 2 of the present invention. FIG. 8(a) shows a dividing section of a metallic line for an intersecting position of the metallic line of a meshed metallic layer and a contour of a column electrode when forming the column electrode of the touch panel by patterning the meshed metallic layer. FIG. 8(b) shows the enlarged A8 portion of FIG. 8(a).

In addition to the configuration of the touch panel of Embodiment 1, the touch panel of Embodiment 2 has a structure in which a mesh side section in a metallic line Mw2 having two intersecting positions of the metallic line Mw2 of the meshed metallic layer and an ideal contour Sp2 (division band Db2) of the column electrode is divided at a center position Cpr between two intersecting positions Cp1 and Cp2.

A mask pattern of such a column electrode can be obtained by setting a square region Rs for dividing the metallic line Mw2 at the center position Cpr between the two intersecting positions Cp1 and Cp2 as shown in FIG. 8(b) in Step S3 as explained in Embodiment 1, i.e., in a step for setting the layout L3' of a region occupied by a square shape.

Further, Embodiment 2 has a structure in which a mesh side section in a metallic line having two intersecting positions of the metallic line of the meshed metallic layer and an ideal contour is divided at a center position between two intersection positions for a row electrode as for a column electrode.

In this manner, in Embodiment 2, the meshed metallic layer constituting the row electrode has a structure in which the mesh side section in the metallic line Mw2 having two intersecting positions of the metallic line of the meshed metallic layer and the ideal contour thereof is divided at the center position between two intersection positions, and the meshed metallic layer constituting the column electrode has a structure in which a mesh side section in the metallic line Mw2 having two intersecting positions of the metallic line Mw2 of the meshed metallic layer and the ideal contour Sp2 thereof is divided at the center position Cpr between the two intersection positions Cp1 and Cp2. Thus, such a structure avoids a metallic line being divided at two places in a single mesh by patterning the meshed metallic layer, which produces a short metallic line fragment. It is therefore possible to avoid a shorter metal line fragment from coming off from an insulation sheet substrate to cause a short circuit between adjacent row electrodes or column electrodes.

In Embodiment 2, the meshed metallic layer constituting the row electrode or the column electrode has a structure in which the mesh side section in the metallic line having two intersecting positions of the metallic line of the meshed metallic layer and the ideal contour of the row electrode or the column electrode is divided at the center position Cpr between the two intersecting positions Cp1 and Cp2. In this case, the position of division is not limited to the center position between the two intersection positions Cp1 and Cp2. Such a position may be any position between the two intersecting positions Cp1 and Cp2.

Furthermore, it is not necessary, depending on processing conditions, in Embodiment 2 to separate the dividing section of the metallic line by a predetermined distance from an intersection of the metallic lines as in Embodiment 1.

For example, when the degree of swelling in the metallic line at an intersection or the vicinity thereof is small, the mesh side section having two intersecting positions which intersect the ideal contour of the row electrode or the column electrode, is merely divided between the two intersecting sections which allows to avoid the generation of a short metallic line fragment prone to coming off, and avoid a short circuit at the row electrode or column electrode, as well as suppress uneven shading due to a short metallic line fragment randomly coming off.

(Embodiment 3)

Figure 9:
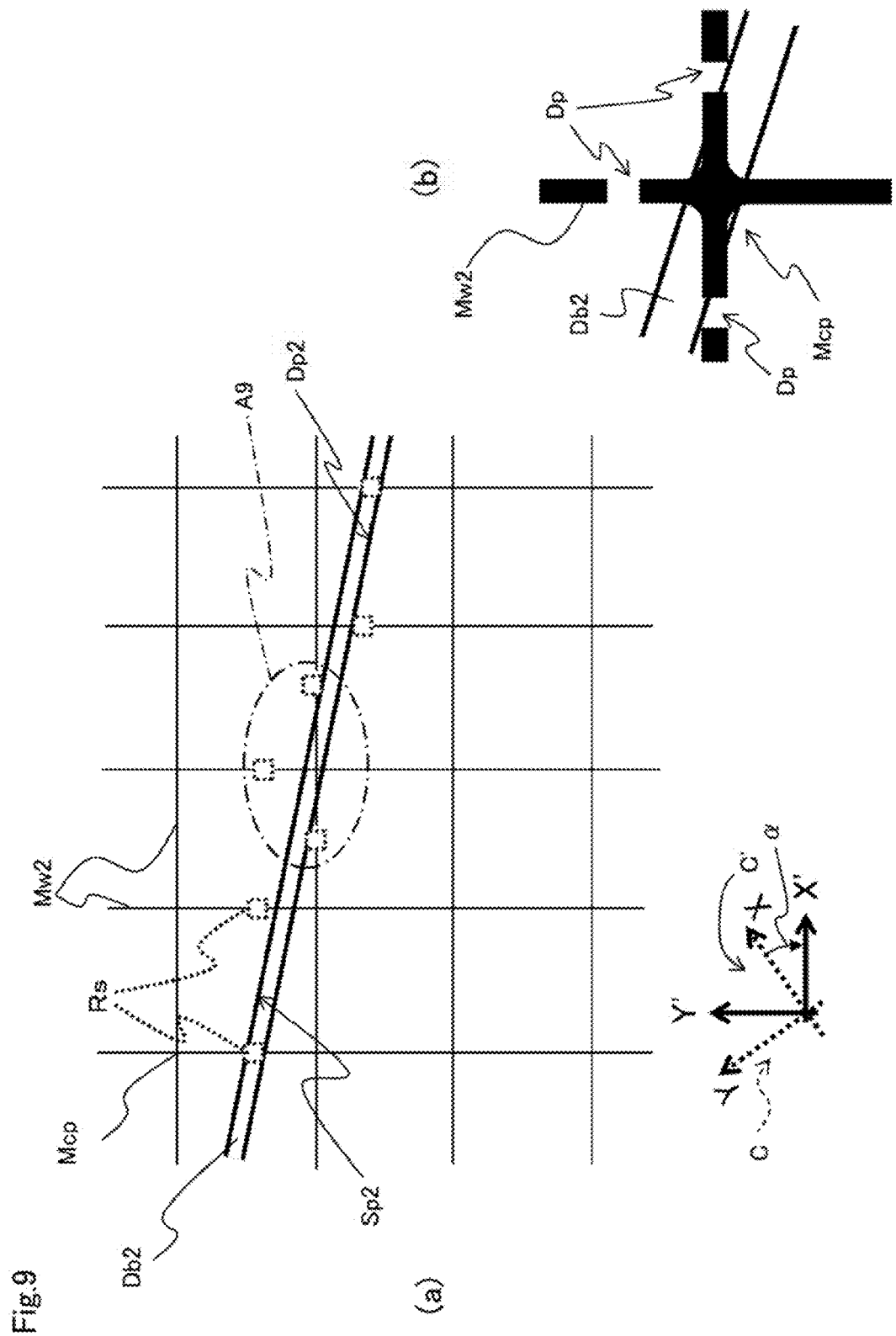
FIG. 9 is a diagram for explaining a capacitive touch panel that is an input device according to Embodiment 3 of the present invention.

FIG. 9 is a diagram for explaining a capacitive touch panel that is an input device according to Embodiment 3 of the present invention. FIG. 9(a) shows a divided part of a metallic line for an intersecting position of the metallic line of a meshed metallic layer and an ideal contour Sp2 of a column electrode when forming the column electrode of this touch panel by patterning the meshed metallic layer. FIG. 9(b) shows an enlarged dividing section Dp of the column electrode corresponding to the A9 portion of FIG. 9(a).

In addition to the configuration of the touch panel in Embodiment 2, the touch panel of Embodiment 3 has a structure in which at a section where an intersection Mcp of the metallic lines of the meshed metallic layer overlaps with a division band Db2 along the ideal contour Sp2 of the column electrode for the patterning of the column electrode, a metallic line Mw2 is divided at three places that are separated by a certain distance from the intersection Mcp. A row electrode has the same structure as the column electrode.

In other words, a metallic line Mw2 is not divided at the intersection (specific intersection) Mcp of metallic lines overlapping the division band Db2 for patterning the column electrode. Three mesh side sections among a plurality of mesh side sections connecting to the specific intersection are divided at a position in the vicinity separated by a certain distance from the specific intersection. Herein, the distance by which the dividing section Dp (i.e., square region Rs) is separated from the intersection Mcp, is at least an amount of distance at which a portion that is thicker than a portion other than the intersecting section of the metallic line in the vicinity of the intersection section of the metallic line which is not divided as explained in Embodiment 1.

Such a mask pattern for a column electrode can be obtained by disposing a square region Rs for dividing a metallic line at a position in the vicinity separated by a certain distance from the specific intersection, in three mesh side sections among a plurality of mesh side sections connecting to the specific intersection, without disposing the square region Rs for dividing the metallic line at the specific intersection Mcp overlapping with the division band Db2, as shown in the A9 portion of FIG. 9(a) in Step S3 explained in Embodiment 1, i.e., in a step for setting the layout L3' of a region occupied by a square shape.

Further, in Embodiment 3, as for a row electrode, a metallic line is not divided at the specific intersection overlapping with a division band for patterning a row electrode as in the column electrode, but instead three mesh side sections among a plurality of mesh side sections connecting to the specific intersection are divided at a position in the vicinity separated by a certain distance from the specific intersection.

Figure 10:
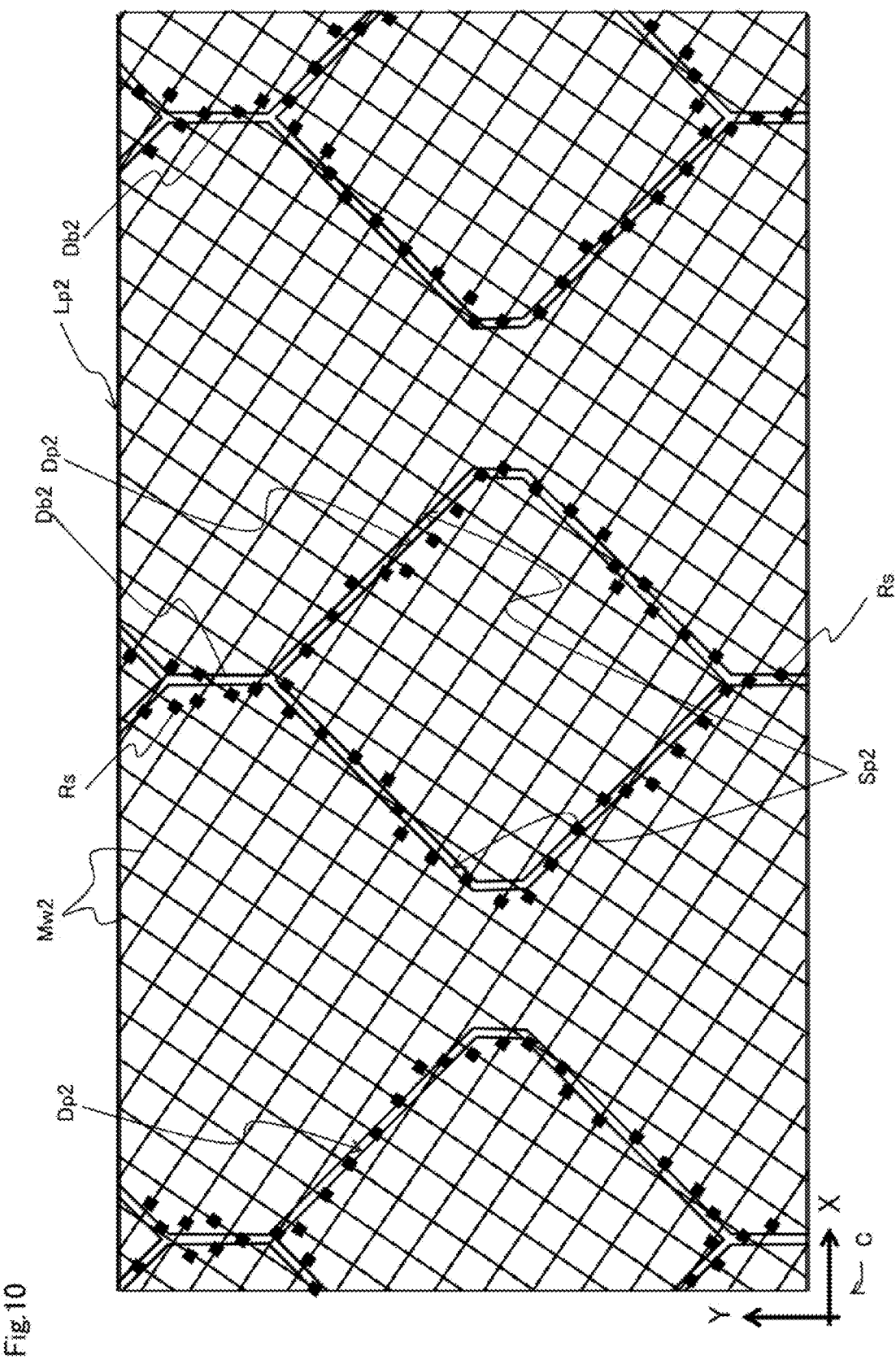
FIG. 10 is a diagram showing a state in which the contour of the column electrode in the touch panel of Embodiment 3 is overlaid on the meshed metallic layer and square regions Rs for dividing metallic lines disposed on the metallic lines in accordance with the rules of Embodiment 3 in step S3.
Figure 11:
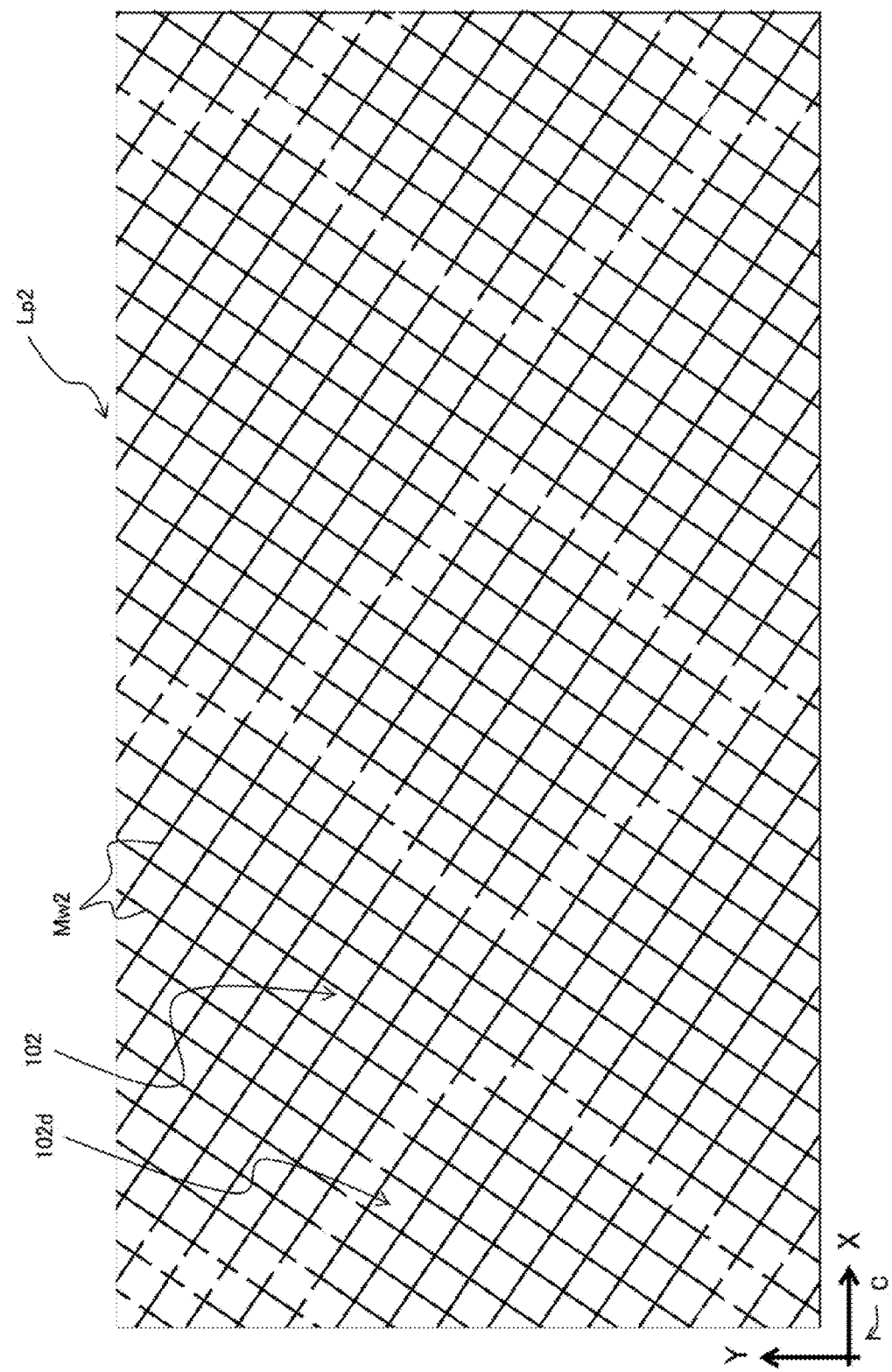
FIG. 11 is a diagram showing a column electrode 102 and a dummy electrode 102d thereof with a mesh structure, obtained by dividing a portion of the metallic lines where the above-described square regions Rs are disposed.

FIG. 10 shows a state in which the ideal contours Sp2 and Dp2 of the column electrode and the dummy electrode in the touch panel of Embodiment 3 are overlaid on the meshed metallic layer Lp2 and square regions Rs for dividing metallic lines are disposed on the metallic lines Mw2 in accordance with the rules of Embodiment 3, in step S3 explained in Embodiment 1. Furthermore, FIG. 11 shows a column electrode 102 and a dummy electrode 102d with a mesh structure obtained by dividing a portion of the above-described metallic lines Mw2 where the above-described square regions Rs are disposed. In FIG. 11, the actual contours of the column electrode 102 and the dummy electrode 102d with a mesh structure thereof appear as a region along a portion where the metallic line is removed.

In this manner, in addition to the above-described configuration of Embodiment 2, the metallic line is not divided at the specific intersecting section of the metallic line where the division band for patterning the row electrode overlaps the meshed metallic layer constituting the row electrode, but instead the metallic line is divided at three places at positions in the upper, lower, left, and right vicinity of the intersecting section separated by a certain distance from the specific intersecting section of the metallic line in Embodiment 3. Further, the metallic line is not divided at the specific intersecting section Mcp of the metallic line where the division band Dp2 for patterning the column electrode 102 overlaps the meshed metallic layer Lp2 constituting the column electrode, but instead the metallic line is divided at three places at positions in the upper, lower, left and right vicinity of the specific intersecting section Mcp separated by a certain distance from the specific intersecting section Mcp of the metallic line. Thus, in addition to the above-described effect of Embodiment 2, an effect is obtained, which can ensure electric separation between the row electrode and the column electrode and the respective dummy electrodes thereof while avoiding division at the specific intersection of the metallic line where the division band for patterning the row electrode and the column electrode overlaps.

In Embodiment 3, the metallic line is not divided at the specific intersecting section of the metallic line where the division band for patterning the row electrode and the column electrode overlaps in each of the meshed metallic layers constituting the row electrode and the column electrode, but instead the metallic line is divided at three places at positions in the upper, lower, left, and right vicinity of the specific intersecting section separated by a certain distance from the specific intersecting section of the metallic line. However, if the tilt of the division band intersecting the metallic line is known, dividing the metallic line at two places in top, bottom, left and, right of the specific intersecting section along the tilt of the dividing line can ensure electric separation of the row electrode and the column electrode and the respective dummy electrodes thereof while avoiding division at the specific intersection of the metallic line where the division band for patterning the row electrode and the column electrode overlaps.

Furthermore, Embodiment 3 does not require that the dividing section of the metallic line is separated by a predetermined distance from the intersection of the metallic lines as in Embodiment 1 or that the mesh side section having two intersecting positions intersecting the ideal contour of the row electrode or the column electrode is divided between the two intersecting positions as in Embodiment 2, depending on the processing condition. For example, when the extent of swelling of the metallic line is large at the intersection and the vicinity thereof, a certain effect of reducing uneven shading is obtained as long as the direction of dividing the metallic line of the meshed metallic layer is in the direction of the width of the metallic line and division at the intersection and the portions in the vicinity thereof is avoided.

In the above-described Embodiments 1-3, a case in which the shape of a mesh of a meshed metallic layer is a square has been explained. However, the shape of a mesh of a meshed metallic layer is not limited to a square. The present invention is also applicable to cases in which the shape of a mesh of a meshed metallic layer is a parallelogram or rhombus.

(Embodiment 4)

Figure 12:
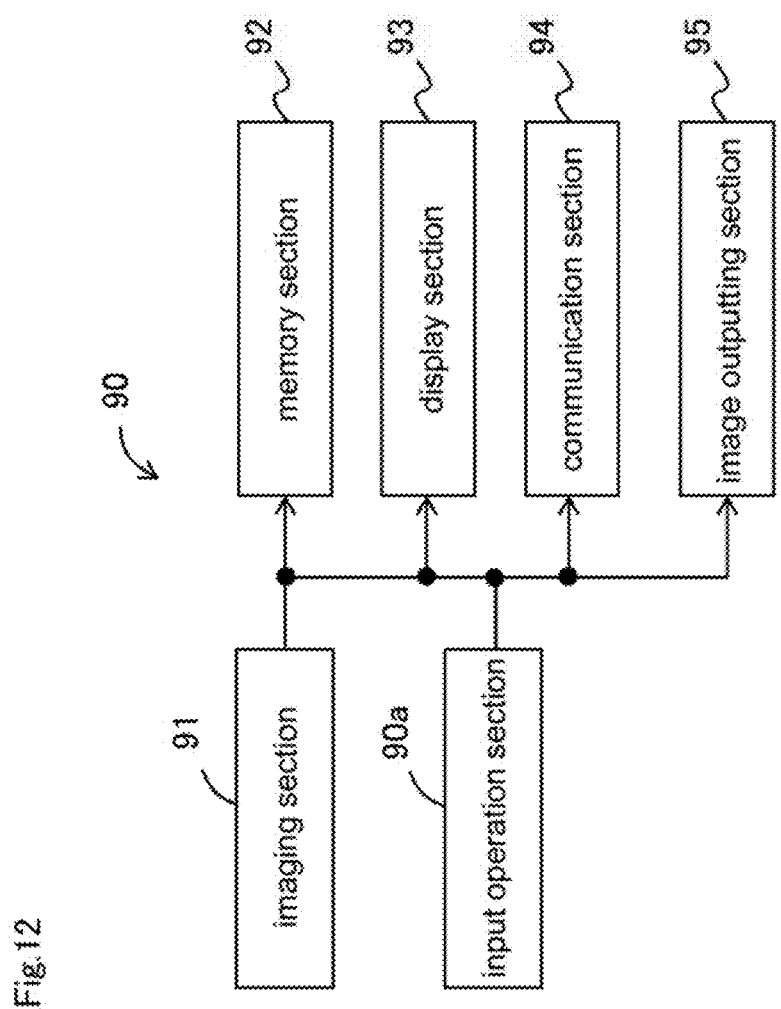
FIG. 12 is a block diagram showing a schematic configuration example of an electronic information equipment using at least one of the input devices of Embodiments 1-3 of the present invention with a display device.
Figure 13:
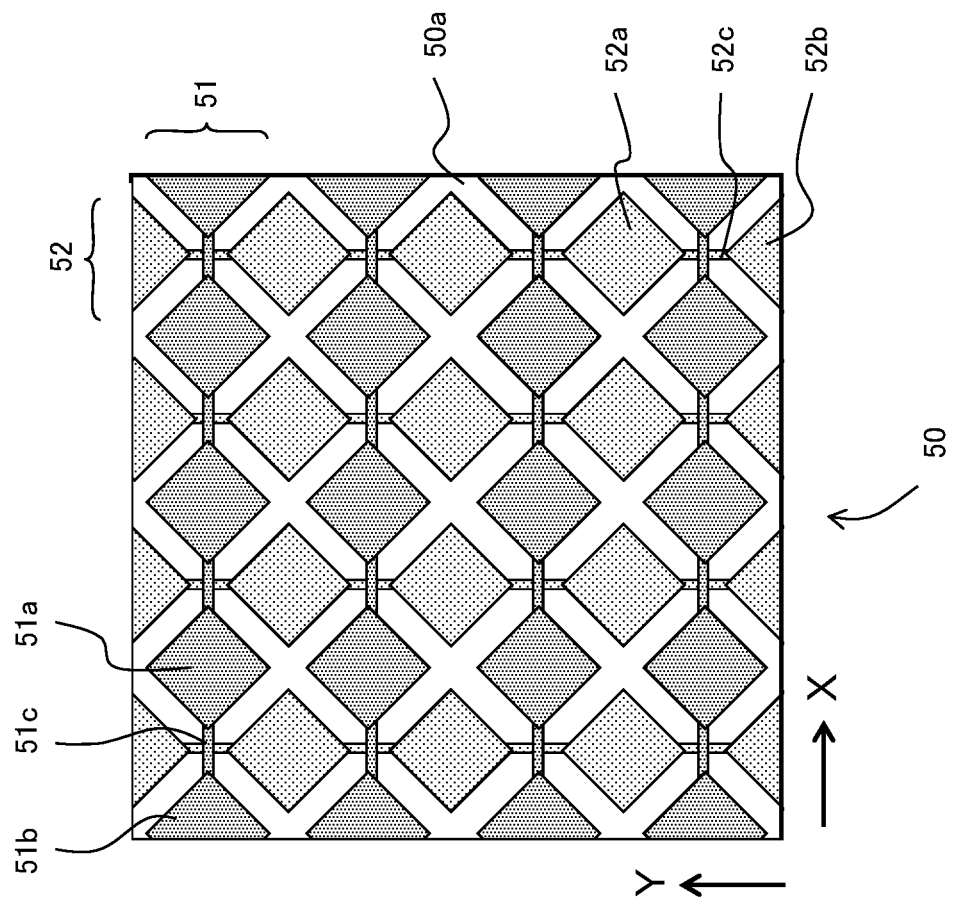
FIG. 13 is a diagram for explaining a conventional capacitive touch panel, showing an arrangement of sensor electrodes for detecting a change in capacitance due to a touch operation or a proximity operation.

FIG. 12 is a block diagram showing a schematic configuration example of electronic information equipment using the input device (capacitive touch panel) according to one of Embodiments 1-3 of the present invention, as an input operation section, as Embodiment 4 of the present invention.

Electronic information equipment 90 according to Embodiment 4 of the present invention shown in FIG. 12 uses an input device (capacitive touch panel) of one of Embodiments 1-3 of the present invention and comprises this input device as an input operation section 90*a* for an operator to input information. The electronic information equipment 90 has at least one of a memory section 92 such as a recording medium for recording input information input from the input operation section 90*a*, a display section 93 such as a liquid crystal display device for displaying this input information on a display screen such as a liquid crystal display screen, a communication section 94 such as a transceiver device for processing communication using this input information, and an image outputting section 95 for printing (printing as characters) and outputting (printing out) this input information. Herein, the display section 93 comprises a display device such as a liquid crystal display panel which is combined with the above-described input device. Further, the electronic information equipment 90 may have an imaging section 91 for capturing a subject. In this case, the electronic information equipment 90 may be configured such that the memory section 92 such as a recording medium records data after predetermined signal processing for recording image data obtained by the imaging section 91, and above-described display section 93 displays the image data on a display screen such as a liquid crystal display screen after predetermined signal processing for display, and the communicating section 94 performs communication processing of the image data after the image data undergoes predetermined signal processing for communication, and the image outputting section 95 prints (print as characters) and outputs (prints out) the image data.

As described above, the present invention is exemplified by the use of its preferred Embodiments of the present invention. However, the present invention should not be interpreted solely based on the Embodiments. It is understood that the scope of the present invention should be interpreted solely based on the scope of the claims. It is also understood that those skilled in the art can implement equivalent scope of technology, based on the description of the present invention and common knowledge from the description of the detailed preferred Embodiments of the present invention. Furthermore, it is understood that any patent, any patent application and any references cited in the present specification should be incorporated by reference in the present specification in the same manner as the contents are specifically described therein.

INDUSTRIAL APPLICABILITY

In the field of input devices, manufacturing methods thereof, and electronic information equipment, the present invention can realize: an input device, which can make areas of individual dividing sections of a conductive line uniform at a row electrode and a column electrode obtained by forming the dividing section on the conductive lines constituting the meshed conductive layer so that the meshed conductive layer is patterned, and thereby suppress uneven shading due to the patterned meshed conductive layer, from appearing on a touch operation surface for a touch operation or a proximity operation formed by the row electrode and the column electrode, resulting in enhancement of the visibility of an image of a display surface recognized through the touch operation surface; a method of manufacturing the same; and electronic information equipment using such an input device.

REFERENCE NUMERAL LIST

90 electronic information equipment
90*a* input operation section
91 imaging section
92 memory section
93 display section
94 communication section
95 image outputting section
100 touch panel
100*a*, 100*b* insulation sheet substrate
101 row electrode (X sensor)
101*a*, 102*a* rhombus sensor electrode
101*b*, 102*b* triangular sensor electrode
101*c*, 102*c* electrode connecting section
101*d*, 102*d* rhombus dummy electrode
101*e*, 102*e* triangular dummy electrode
102 column electrode (Y sensor)
103 insulation adhesive
110 first sensor sheet
120 second sensor sheet
α coordinate rotation angle
C standard coordinate system
C' rotated coordinate system
Cp1, Cp2 intersecting position
Cpr center position
Db1, Db2 division band
Dp1, Dp2 pattern of dummy electrode
Lp1, Lp2 meshed metallic layer
Mcp intersection
Mw1, Mw2 metallic line
Sp1 ideal contour of row electrode (ideal pattern)
Sp2 ideal contour of column electrode (ideal pattern)
Rs square region

The invention claimed is:

1. An input device that detects an input operation by a change in capacitance between meshed electrodes, the input device comprising:
   a plurality of meshed electrodes having a structure made by patterning a meshed conductive layer, the meshed conductive layer including
      a plurality of first conductive lines extending in a first direction,
      a plurality of second conductive line extending in a second direction orthogonal to the first direction such that the plurality of first conductive lines and the plurality of second conductive lines respectively cross each other thereby forming a mesh, and
      a plurality of cut regions formed by patterning the meshed conductive layer using a mask pattern including a plurality of square regions Rs, each square region dividing a single one of the plurality of first and second conductive lines such that one side of the square region is parallel to the first direction and one side is parallel to the second direction, where each of the plurality of cut regions corresponds to one of the plurality of square regions of the mask pattern.

2. The input device of claim 1, wherein the plurality of meshed electrodes are configured such that the first direction toward which the plurality of first conductive lines extend and the second direction toward which the second conductive line extends are set to a direction other than a horizontal direction, a vertical direction, and a diagonal 45° direction of a pixel array consisting of a plurality of pixels, based on an arrangement of the plurality of pixels constituting a display device for displaying an image.

3. The input device of claim 2, wherein the plurality of first conductive lines which extend in the first direction are disposed at certain intervals and the plurality of second conductive lines which extend in the second direction orthogonal to the first direction are disposed at a certain interval, and a mesh of the meshed conductive layer has a square shape.

4. The input device of claim 3, further comprising:
a first meshed conductive layer and a second meshed conductive layer as the meshed conductive layer, and wherein the plurality of meshed electrode comprises,
  a plurality of first meshed electrodes having a structure which extends along the horizontal direction of the pixel array and is made by patterning the first meshed conductive layer, and
  a plurality of second meshed electrodes having a structure which extends along the vertical direction of the pixel array and is made by patterning the second meshed conductive layer,
the first meshed electrodes are constituted of a plurality of first electrode sections arranged along the horizontal direction of the pixel array, and a first connecting section for connecting adjacent first electrode sections, and
the second meshed electrodes are constituted of a plurality of second electrode sections arranged along the vertical direction of the pixel array and a second connecting section for connecting adjacent second electrode sections.

5. The input device of claim 4, wherein
the plurality of first meshed electrodes are formed on a first insulation member,
the plurality of second meshed electrodes are formed on a second insulation member, and
the first and second insulation members are bonded together such that the first electrode sections of the first meshed electrode and the second electrode sections of the second meshed electrode are alternately arranged.

6. The input device of claim 5, wherein
a first dummy electrode section obtained by patterning the first meshed conductive layer is disposed at a portion of the first insulation member opposing the second electrode sections, and
a second dummy electrode section obtained by patterning the second meshed conductive layer is disposed at a portion of the second insulation member opposing the first electrode sections.

7. The input device claim 1, wherein
a line width of the plurality of first and second conductive lines constituting the meshed conductive layer is in the range of 1-10 μm,
the first electrode sections and the second electrode sections have a rhombus shape, and
a dimension of the cut region dividing a conductive line in a direction toward which the conductive lines extends is 40-50 μm.

8. A method of a manufacturing the input device of claim 1, comprising
forming a conductive layer on an insulation substrate, and
forming the plurality of meshed electrodes by applying selective etching processing on the conductive layer by using a photomask.

9. A method of manufacturing the input device of claim 1, comprising printing a conductive layer with a mesh structure having a predetermined pattern on an insulation substrate to form the plurality of meshed electrodes.

10. Electronic information equipment having an image display section for displaying an image and an information inputting section disposed on a display screen of the image display section for inputting information, comprising the input device of claim 1 as the information inputting section.

* * * * *